US007797642B1

(12) United States Patent
Karam et al.

(10) Patent No.: US 7,797,642 B1
(45) Date of Patent: Sep. 14, 2010

(54) METHOD, SYSTEM, AND GRAPHICAL USER INTERFACE FOR MEETING-SPOT-RELATED CONTACT LISTS

(75) Inventors: Joseph F. Karam, Mountain View, CA (US); Divya Shah, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 11/522,548

(22) Filed: Sep. 13, 2006

Related U.S. Application Data

(63) Continuation-in-part of application No. 11/323,142, filed on Dec. 30, 2005.

(51) Int. Cl.
  *G06F 3/048* (2006.01)
  *G06F 3/00* (2006.01)
  *G06T 15/00* (2006.01)
  *G06T 13/00* (2006.01)

(52) U.S. Cl. .............. 715/810; 715/768; 715/764; 715/751; 345/473; 345/419

(58) Field of Classification Search .......... 715/810, 715/764, 753, 768; 751/751; 707/102; 345/473, 345/419
See application file for complete search history.

(56) References Cited

U.S. PATENT DOCUMENTS

| | | | |
|---|---|---|---|
| 6,202,212 B1 * | 3/2001 | Sturgeon et al. | 725/141 |
| 6,366,962 B1 * | 4/2002 | Teibel | 709/245 |
| 6,677,968 B1 * | 1/2004 | Appelman | 715/853 |
| 6,681,108 B1 | 1/2004 | Terry et al. | |
| 6,690,918 B2 | 2/2004 | Evans et al. | 455/41.2 |
| 6,732,120 B1 | 5/2004 | Du | 707/104.1 |
| 6,745,178 B1 | 6/2004 | Emens et al. | 707/3 |
| 6,771,970 B1 * | 8/2004 | Dan | 455/456.1 |
| 6,829,532 B2 * | 12/2004 | Obradovich et al. | 701/207 |
| 6,968,179 B1 * | 11/2005 | De Vries | 455/414.1 |
| 6,981,021 B2 * | 12/2005 | Takakura et al. | 709/204 |
| 7,069,308 B2 | 6/2006 | Abrams | |
| 7,117,254 B2 * | 10/2006 | Lunt et al. | 709/218 |

(Continued)

FOREIGN PATENT DOCUMENTS

WO   WO 02/01405   1/2002

(Continued)

OTHER PUBLICATIONS

Alex Barnet, Wayback Machine (Archive.Org) Alex Barnet Blog website, Oct. 26, 2005, pp. 1-5.*

(Continued)

*Primary Examiner*—Simon Ke
*Assistant Examiner*—Erik V Stitt
(74) *Attorney, Agent, or Firm*—Morgan, Lewis & Bockius LLP

(57) ABSTRACT

A method, system, and graphical user interface for meeting-spot-related contact lists are disclosed. A "meeting spot" is a specific physical location where two or more people can arrange to meet face to face. One aspect of the invention involves a computer-implemented method in which a computer generates a contact list for a first user, wherein the contact list includes an identifier for a meeting spot and an adjacent list of contact information for other users associated with the meeting spot.

22 Claims, 21 Drawing Sheets

U.S. PATENT DOCUMENTS

| | | | | |
|---|---|---|---|---|
| 7,136,915 | B2* | 11/2006 | Rieger, III | 709/223 |
| 7,188,153 | B2* | 3/2007 | Lunt et al. | 709/218 |
| 7,200,638 | B2* | 4/2007 | Lake | 709/206 |
| 7,222,187 | B2* | 5/2007 | Yeager et al. | 709/237 |
| 7,234,117 | B2* | 6/2007 | Zaner et al. | 715/758 |
| 7,243,075 | B1* | 7/2007 | Shaffer et al. | 705/10 |
| 7,342,587 | B2* | 3/2008 | Danzig et al. | 345/473 |
| 7,373,244 | B2 | 5/2008 | Kreft | 701/207 |
| 7,468,729 | B1* | 12/2008 | Levinson | 345/473 |
| 7,472,352 | B2 | 12/2008 | Liversidge et al. | |
| 2002/0007396 | A1 | 1/2002 | Takakura et al. | 709/204 |
| 2002/0013738 | A1 | 1/2002 | Vistisen | |
| 2002/0055926 | A1* | 5/2002 | Dan et al. | 707/100 |
| 2002/0103892 | A1 | 8/2002 | Rieger, III | 709/223 |
| 2002/0116458 | A1 | 8/2002 | Bricklin et al. | 709/204 |
| 2002/0130904 | A1 | 9/2002 | Becker et al. | |
| 2003/0037110 | A1* | 2/2003 | Yamamoto | 709/204 |
| 2003/0055983 | A1* | 3/2003 | Callegari | 709/227 |
| 2003/0078981 | A1* | 4/2003 | Harms et al. | 709/206 |
| 2003/0079024 | A1* | 4/2003 | Hough et al. | 709/227 |
| 2003/0135493 | A1* | 7/2003 | Phelan et al. | 707/3 |
| 2003/0154250 | A1 | 8/2003 | Miyashita | |
| 2004/0041836 | A1* | 3/2004 | Zaner et al. | 345/751 |
| 2004/0054572 | A1* | 3/2004 | Oldale et al. | 705/10 |
| 2004/0122810 | A1 | 6/2004 | Mayer | 707/3 |
| 2004/0148351 | A1* | 7/2004 | Cotte | 709/205 |
| 2004/0162830 | A1 | 8/2004 | Shirwadkar et al. | 705/10 |
| 2004/0172455 | A1 | 9/2004 | Green et al. | 709/207 |
| 2004/0189701 | A1 | 9/2004 | Badt, Jr. | |
| 2004/0210844 | A1 | 10/2004 | Pettinati et al. | 715/708 |
| 2005/0065995 | A1* | 3/2005 | Milstein et al. | 709/202 |
| 2005/0086211 | A1 | 4/2005 | Mayer | 705/1 |
| 2005/0130634 | A1 | 6/2005 | Godfrey | |
| 2005/0154639 | A1 | 7/2005 | Zetmeir | 705/14 |
| 2005/0165715 | A1 | 7/2005 | Farnham et al. | 707/100 |
| 2005/0172001 | A1 | 8/2005 | Zaner et al. | 709/205 |
| 2005/0174975 | A1 | 8/2005 | Mgrdechian et al. | 370/338 |
| 2005/0177385 | A1 | 8/2005 | Hull et al. | 707/103 |
| 2005/0193054 | A1 | 9/2005 | Wilson et al. | 709/225 |
| 2005/0197846 | A1* | 9/2005 | Pezaris et al. | 705/1 |
| 2005/0198031 | A1* | 9/2005 | Pezaris et al. | 707/9 |
| 2005/0210102 | A1 | 9/2005 | Johnson et al. | 709/218 |
| 2005/0210409 | A1 | 9/2005 | Jou | |
| 2005/0246866 | A1 | 11/2005 | Dalsing et al. | |
| 2005/0246886 | A1* | 11/2005 | Morel | 29/596 |
| 2005/0256866 | A1* | 11/2005 | Lu et al. | 707/5 |
| 2005/0283308 | A1 | 12/2005 | Szabo et al. | 701/207 |
| 2006/0031772 | A1* | 2/2006 | Valeski | 715/751 |
| 2006/0085259 | A1 | 4/2006 | Nicholas et al. | 705/14 |
| 2006/0190536 | A1* | 8/2006 | Strong et al. | 709/204 |
| 2006/0235873 | A1* | 10/2006 | Thomas | 707/102 |
| 2006/0241859 | A1 | 10/2006 | Kimchi et al. | 701/208 |
| 2006/0294134 | A1* | 12/2006 | Berkhim et al. | 707/102 |
| 2007/0067098 | A1 | 3/2007 | Zelentsov | 701/208 |
| 2007/0112735 | A1* | 5/2007 | Holloway et al. | 707/3 |
| 2007/0118809 | A1* | 5/2007 | Ozugur et al. | 715/776 |
| 2007/0162862 | A1* | 7/2007 | Ogasawara et al. | 715/751 |

FOREIGN PATENT DOCUMENTS

| | | |
|---|---|---|
| WO | WO 2005/006145 | 1/2005 |
| WO | WO 2005/074443 | 8/2005 |
| WO | WO 2005/077068 | 8/2005 |

OTHER PUBLICATIONS

CNET Review of Google Maps, web address: http://reviews.cnet.com/online-software-services/google-maps/4505-9239_7-31591128.html, published Nov. 7, 2005, 6 pages.

Office Action mailed Jan. 7, 2008 for related U.S. Appl. No. 11/323,090.

Office Action mailed Jun. 10, 2008 for related U.S. Appl. No. 11/323,090.

Office Action mailed Apr. 2, 2008 for related U.S. Appl. No. 11/323,115.

Office Action mailed Jun. 25, 2008 for related U.S. Appl. No. 11/323,142.

Office Action mailed Jul. 11, 2008 in U.S. Appl. No. 11/759,848.

Office Action mailed Oct. 1, 2008 in U.S. Appl. No. 11/323,142.

Office Action mailed Oct. 1, 2008 in U.S. Appl. No. 11/323,090.

Office Action mailed Aug. 21, 2008 in U.S. Appl. No. 11/323,090.

Office Action mailed Sep. 24, 2008 in U.S. Appl. No. 11/323,115.

Office Action dated Apr. 1, 2009 in U.S. Appl. No. 11/323,115.

Office Action dated Aug. 28, 2009 in U.S. Appl. No. 11/323,115.

Office Action dated Nov. 26, 2008 in U.S. Appl. No. 11/323,142.

Office Action dated Feb. 3, 2009 in U.S. Appl. No. 11/323,142.

Office Action dated Apr. 28, 2009 in U.S. Appl. No. 11/323,142.

Office Action/Interview Summary dated Oct. 1, 2008 in U.S. Appl. No. 11/759,848.

Office Action dated Dec. 29, 2008 in U.S. Appl. No. 11/759,848.

Office Action dated Mar. 3, 2009 in U.S. Appl. No. 11/759,848.

Office Action dated Mar. 13, 2009 in U.S. Appl. No. 11/759,848.

Office Action dated Mar. 16, 2009 in U.S. Appl. No. 11/759,848.

Office Action mailed Jun. 10, 2009 in U.S. Appl. No. 11/759,848.

Office Action mailed Aug. 24, 2009 in U.S. Appl. No. 11/759,848.

Office Action mailed Apr. 1, 2008 in U.S. Appl. No. 11/323,090.

Office Action mailed Apr. 14, 2009 in U.S. Appl. No. 11/323,090.

Office Action mailed Jun. 24, 2009 in U.S. Appl. No. 11/323,090.

Office Action mailed Jun. 29, 2009 in U.S. Appl. No. 11/323,090.

Balkin, A., "New Cell Phone Services Can Help Manage Your Social Life", Apr. 6, 2005, published Sep. 26, 2005 by NYI News.

Barnett, A., Wayback Machine (Archive. Org) Alex Barnet Blog Website, Oct. 26, 2005, pp. 1-5.

Bleecker, J., "Location-based mobile media: maps, games & stories", Interactive Media Division, School of Cinema-TV, University of Southern California, Fall 2005.

Burak, A., et al., "Analyzing Usage of Location based Services", CHI 2003, Apr. 5-10, 2003, Ft. Lauderdale, FL. ACM 1-58113-630-7/03/0004.

Burak, A., et al. "Usage Patterns of FriendZone—Mobile Location-Based Community Services", http://www.this.net/-frank/pstill,hatml.

Campbell, S., et al., "Blogscape: Cartography on Social Networks", Dec. 12, 2005.

Johnson, S., "Friends 2005: Hooking Up", Discover, vol. 26, No. 9, Sep. 2005, pp. 22-23.

Laycock, J., "Amazon's A9 Offers Unique Local Search Experience", Mar. 17, 2005, www.searchengineguide.com/laycock/003701.html.

Piesick, J., "Click to Call: Creating Sales and Customer Satisfaction", ArriveNet Business Editorials, >http://editorials.arrivenet.com/business/print.th ?url-htp://64.233.16.

Risnes, O., "Developing Advanced Parlay-Enabled Value Added Services", Telenor Forksningsnotat/Scientofic Document R&D N 76/2003, Jan. 7, 2004.

Schoder, D., "Targeting mobile Consumers (I): context-independent mobile B2CApplications", Lecture Unit 5, WHU, EEB FS 2003.

Smith, B., "Spreading the Word with Moblogs" Jun. 15, 2005, Wireless Week, www.wirelessweek.com/article/CA608001.html?text=spreading+the+word+with+.

Vogiazou, Y., et al., "Presence Based Play: Towards a Design for Large Group Social Interaction", Proceedings of the First International Conference on Appliance Design) (I AD), 68 May 2003, Bristol, UK.

Apple.com, "iChat AV Videoconferencing for the rest of us", www.apple.com/macosx/features/ichat, Oct. 25, 2005.

GeoCommunity Staff, "Affiliate and Reseller Programs for GIS, Geo-Spatial and Location Based Content Websites", GeoCommunity.com, http://spatialnews.geocom.com/features/geosellers, 5 pages, 2005.

"WaveMarket's Crunkie Puts Mobile Social Networks on the Map", Nov. 15, 2004, www.prnewswire.com/cgi-bin/stories.pl?ACCT=104 &story=/www/story/11-15.

WaveBlog product information, Demo, 2004, www.demo.com/demonstrators/demo2004/54868.html.

dodgeball.com, Company Information, (no date), www.dodgeball.com., 2 pages, 2005.

"Mates, when social networks marry presence", *Om Malik's Broadband Blog*, posted 005/04/2005, http://gigaom.com/2005/05/04/mates-when-social-networks-marry-presence/.

"Entering the UMTS era—mobile applications for pocket devices and services", Part Two, European Information Technology Observatory, EITO 2002, pp. 203-219.

"Mobile Marketing and Wireless Internet Advertising", Position Paper, InterACT Research Communications Company, Nov. 1999.

"Application for today's mobile lifestyle", Community Messaging Center (CMC) 5.0, HP OpenCall—Yomi, Hewlett-Packard Development Company, 5982-2057EE, Oct. 2003. "Talk and IM with your friends for free", Google Talk, www.fzoogle.com/talk.

Amazon.com Yellow Page (sample page), www.amazon.com/gyp/yp/B0004KKOPC/1034107609-18318..., Dec. 23, 2005.

"Extensible Messaging and Presence Protocol (XMPP): Instant Messaging and Presence," P. Sanit-Andre, Ed., Jabber Software Foundation, Oct. 2004, pp. 1-90.

LocationNet.com My Maps, LocationNet.com, Aug. 5, 2005.

LocationNet.com, Products Demo, LocationNet.com, Aug. 5, 2005.

WaveMarket.com, Company and Product Overview, www.wavemarket.com, 12 pages, 2004.

http://digg.com/sotfware/New Page Specific Chat Extension Launched for Firefox (Safari and IE soon) 2007, 3 pages.

http://www.chatsum.com, Nov. 16, 2007, 4 pages.

http://www.chatsum.com/about, Nov. 16, 2007, 2 pages.

Office Action mailed Jul. 8, 2008 in U.S. Appl. No. 11/522,548.

Office Action mailed Apr. 2, 2008 in U.S. Appl. No. 11/323,115.

Office Action mailed Jan. 7, 2008 in U.S. Appl. No. 11/323,090.

Office Action mailed Jun. 10, 2008 in U.S. Appl. No. 11/323,090.

\* cited by examiner

US 7,797,642 B1

METHOD, SYSTEM, AND GRAPHICAL USER INTERFACE FOR MEETING-SPOT-RELATED CONTACT LISTS

RELATED APPLICATIONS

This application is a continuation-in-part of U.S. patent application Ser. No. 11/323,142, filed Dec. 30, 2005, entitled "Method, System, and Graphical User Interface for Meeting-Spot-Related Online Communications," which application is incorporated by reference herein in its entirety.

This application is related to U.S. patent application Ser. No. 11/323,090, filed Dec. 30, 2005, entitled "Method, System, and Graphical User Interface for Meeting-Spot Maps for Online Communications," which application is incorporated by reference herein in its entirety.

This application is related to U.S. patent application Ser. No. 11/323,115, filed Dec. 30, 2005, entitled "Method, System, and Graphical User Interface for Identifying and Communicating with Meeting Spots," which application is incorporated by reference herein in its entirety.

TECHNICAL FIELD

The disclosed embodiments relate generally to online communications. More particularly, the disclosed embodiments relate to methods, systems, and graphical user interfaces for meeting-spot-related online communications.

BACKGROUND

People increasingly use online communications to interact with their friends and to meet new people. As used herein, "online communications" means real-time online communications technologies, including character-based technologies (e.g., text-based instant messaging, but not e-mail), audio technologies (e.g., audio chat and Voice over Internet Protocol (VoIP) telephony), and video technologies (e.g., video chat).

Numerous techniques have been developed that use online communications to improve our social lives, including social networking and online dating services. These techniques typically require a user to fill out a personal profile, which can be cumbersome and also raises privacy concerns. Thus, it would be highly desirable to find new, less cumbersome, more intuitive, and more secure ways to use online communications to interact with friends and to meet new people.

SUMMARY

The present invention overcomes the limitations and disadvantages described above by providing methods, systems, and graphical user interfaces (GUIs) for meeting-spot-related online communications. As used herein, a "meeting spot" is a specific physical location where two or more people could arrange to meet face to face. Exemplary meeting spots include, without limitation, a restaurant, bar, club, library, gym, bookstore, park, or store. Note that a meeting spot is limited in size so that two people can find (or can reasonably be expected to find) each other at the spot. For example, Manhattan is too large to be a meeting spot, but the Four Seasons restaurant at 99 E. 52nd St. in Manhattan could be a meeting spot.

One aspect of the invention involves a computer-implemented method in which a computer (e.g., a server computer): identifies one or more meeting spots associated with a first user; for at least some of the identified meeting spots, identifies a plurality of other users associated with the meeting spot; for at least some of the identified meeting spots, selects a subset of the identified other users based on predefined criteria; and generates for presentation in a display region a list of user contact information that corresponds to the selected subset of users.

Another aspect of the invention involves a computer-implemented method in which a server computer: associates a first user with a meeting spot; identifies a plurality of users other than the first user that are also associated with the meeting spot; selects at least some of the identified users based on predefined criteria; and sends user contact information that corresponds to the selected users to a client device associated with the first user for presentation.

Another aspect of the invention involves a computer-implemented method in which a client device associated with a first user: receives from a server computer contact information for a plurality of users associated with a meeting spot; and displays an identifier for the meeting spot and at least some of the contact information for the plurality of users associated with the meeting spot.

Another aspect of the invention involves a computer-implemented method in which a computer generates a contact list for a first user, wherein the contact list includes an identifier for a meeting spot and an adjacent list of contact information for other users associated with the meeting spot.

Another aspect of the invention involves a graphical user interface on a client device that includes: a contact list for a first user; in the contact list, an identifier for a meeting spot; and a list of contact information for a plurality of users that are associated with the meeting spot.

Another aspect of the invention involves a server that includes one or more processors, memory; and a program. The program is stored in the memory and configured to be executed by the one or more processors. The program includes: instructions for associating a first user with a meeting spot; instructions for identifying a plurality of users other than the first user that are also associated with the meeting spot; instructions for selecting at least some of the identified users based on predefined criteria; and instructions for sending user contact information that corresponds to the selected users to a client device associated with the first user for presentation.

Another aspect of the invention involves a client device that includes one or more processors, memory; and a program. The program is stored in the memory and configured to be executed by the one or more processors. The program includes: instructions for receiving from a server computer contact information for a plurality of users associated with a meeting spot; and instructions for displaying an identifier for the meeting spot and at least some of the contact information for the plurality of users associated with the meeting spot.

Another aspect of the invention involves a computer-program product that includes a computer readable storage medium and a computer program mechanism embedded therein. The computer program mechanism includes instructions, which when executed by a server, cause the server to: associate a first user with a meeting spot; identify a plurality of users other than the first user that are also associated with the meeting spot; select at least some of the identified users based on predefined criteria; and send user contact information that corresponds to the selected users to a client device associated with the first user for presentation.

Another aspect of the invention involves a computer-program product that includes a computer readable storage medium and a computer program mechanism embedded therein. The computer program mechanism includes instructions, which when executed by a client device, cause the client device to: receive from a server computer contact information for a plurality of users associated with a meeting spot; and display an identifier for the meeting spot and at least some of the contact information for the plurality of users associated with the meeting spot.

Another aspect of the invention involves a server computer, comprising: means for associating a first user with a meeting spot; means for identifying a plurality of users other than the first user that are also associated with the meeting spot; means for selecting at least some of the identified users based on predefined criteria; and means for sending user contact information that corresponds to the selected users to a client device associated with the first user for presentation.

Another aspect of the invention involves a client device, comprising: means for receiving from a server computer contact information for a plurality of users associated with a meeting spot; and means for displaying an identifier for the meeting spot and at least some of the contact information for the plurality of users associated with the meeting spot.

Thus, meeting-spot-related online communications provide more intuitive, less invasive methods, systems, and GUIs to interact with friends and to meet new people.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Methods, systems, and graphical user interfaces for meeting-spot-related online communications are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Figure 1:
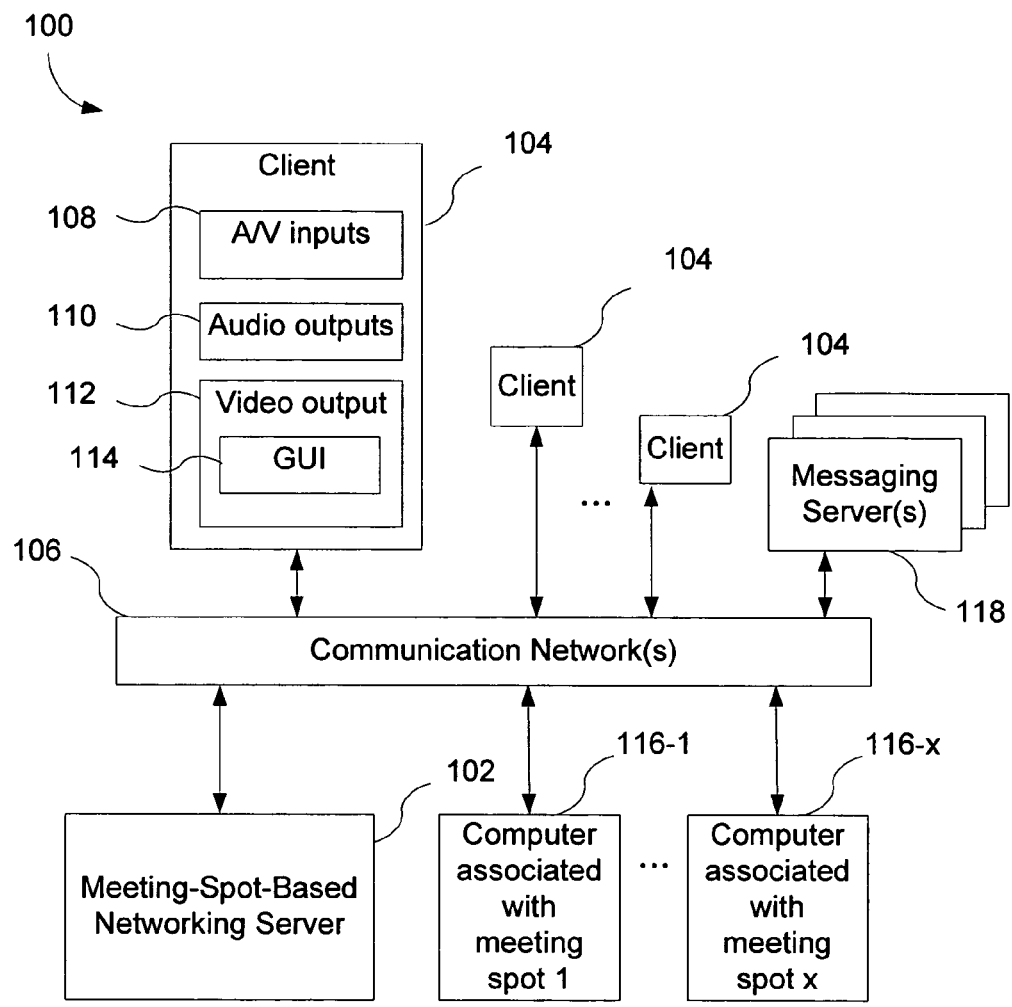
FIG. 1 is a block diagram illustrating an exemplary distributed computer system in accordance with one embodiment of the invention.

FIG. 1 is a block diagram illustrating an exemplary distributed computer system 100 according to one embodiment of the invention. FIG. 1 shows various functional components that will be referred to in the detailed discussion that follows. This system includes client devices 104, meeting-spot-based networking server 102, a computer associated with a meeting spot 116, messaging server(s) 118, and communication network(s) 106 for interconnecting these components.

Client 104 can be any of a number of devices (e.g., an internet kiosk, personal digital assistant, cell phone, gaming device, desktop computer, or laptop computer, handheld computer, or a combination thereof) used to enable the activities described below. Client 104 typically includes audio and/or video inputs 108 (e.g., a microphone and a video camera), audio output 110 (e.g., speakers or headphones), and video output 112 (e.g., a display). Video output 112 displays a graphical user interface (GUI) 114.

The computer 116 associated with the meeting spot may be a computer used to make reservations for the meeting spot or to provide other services associated with the meeting spot. Computer 116 may optionally be used to host chat rooms or other multi-user communications. The computer 116 associated with the meeting spot may be located at the meeting spot, or anywhere else (e.g., at the facility of a computer services provider that provides services for the meeting spot).

One or more messaging servers 118 provide online communications services to clients 104. The messaging servers 118 store information associated with the users of the service, user status information, and contact lists of users, further details of which are described below, in relation to FIGS. 18A-18C. In some embodiments, the messaging servers 118 store and relay online communications to and from clients 104. In some other embodiments, the messaging servers 118 provide information to be used by a client to directly connect to another client (e.g., using peer-to-peer connection methodologies). The messaging servers 118 and clients 104 may utilize any of a plurality of online communications protocols, including but not limited to Internet Relay Chat (IRC), OSCAR, JABBER, etc. In some embodiments, the functions of messaging server(s) 118 are incorporated in meeting-spot-based networking server 102, e.g., as part of network communications module 212.

In some embodiments, the messaging servers 118 monitor and manage the status information of the users of one or more online communications services (e.g., text messaging, audio chat, VoIP telephony, and/or video chat). Whenever a client application associated with a user of the online communications service is not running on a client or is running but is otherwise not in communication with the messaging servers 118, the user is considered to be offline. If the client application is running and is in communication with the messaging servers 118, the user is considered to be online. Whenever a user goes from offline to online, the client application (e.g. text messaging module 314, audio module 316, or video module 318) sends a message to the messaging servers 118 announcing the change in status. The messaging servers 118 update the status information associated with the user to reflect the status change. The messaging servers 118 may forward the status of a user A to a client application associated with a user B who is interested in the status of user A. In some embodiments, the status of user A is forwarded to user B and other users by a broadcast or multicast message.

The status information monitored by the messaging servers 118 may be further refined. One or more predefined statuses may be provided and serve as a default set of statuses. One or more status messages, which are text strings that describe the status in further detail, may be associated with the predefined statues. The client application may be set to any one of the predefined statuses by user intervention or as an automatic response to particular events. The predefined statuses serve to indicate in greater detail the user's willingness and/or availability to exchange online communications with other users.

In some embodiments, the predefined user statuses may include "active," "idle," "busy," "chatty," and "offline." "Active" means that the user is available to send and/or receive online communications. "Idle" (or "away") means that the user has not been actively using the client for at least a specified amount of time, and by implication, is away from the client. "Busy" means that the user is preoccupied with other matters (e.g., actively using another client application) and is not available for sending and/or receiving online communications. "Chatty" means that the user is actively sending and/or receiving online communications and may be willing to send and/or receive more. "Offline" means that the user is offline, as described above. A user that is "active," "idle," "busy," or "chatty" is also online because the client application is running and in communication with the messaging servers 118.

It should be appreciated that the statuses described above are merely exemplary. Additional and/or alternative statuses may also be used.

In some embodiments, a user may also define custom statuses and/or custom status messages. For example, a user may define a custom status message saying that he or she is "on vacation."

The messaging servers 118 may also store, for each user of the online communications service, a contact list (sometimes called a buddy list, address book, or the like). The contact list is a roster of one or more contacts associated with the user. A contact is a person with whom the user has previously communicated (by email, voice, IM, video chat, and so on) or with whom the user may wish to choose to communicate (e.g., other users associated with a meeting spot that has been entered and/or tagged by the user). The contact list associates contacts with one or more communication addresses or locators (email address, IM address, phone number, and so on) as well as other information such as a name or profile. A contact may or may not participate in the same IM network as the user and therefore may or may not be reachable over IM. Further information regarding the contact list is described below.

Figure 2:
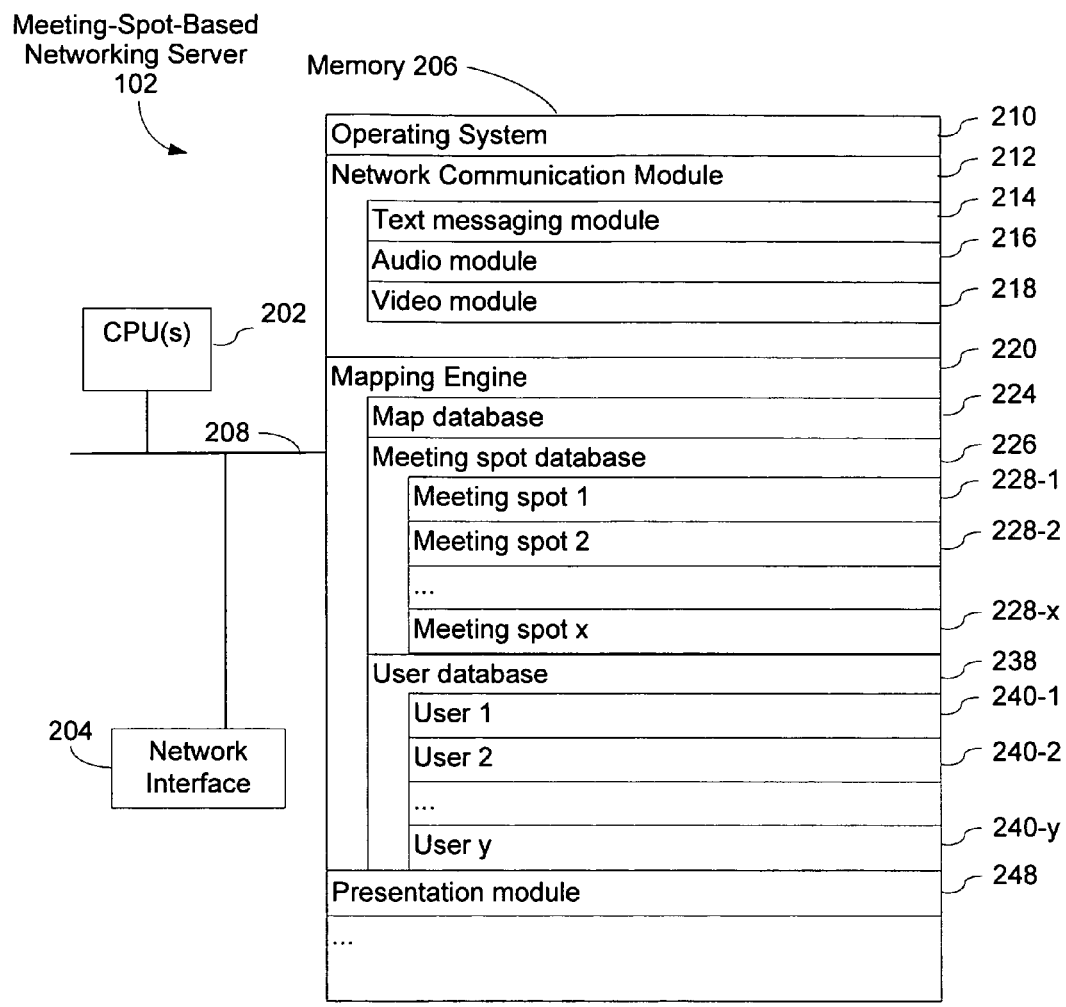
FIG. 2 is a block diagram illustrating a meeting-spot-based networking server in accordance with one embodiment of the present invention.

FIG. 2 is a block diagram illustrating meeting-spot-based networking server 102 in accordance with one embodiment of the present invention. Server 102 typically includes one or more processing units (CPUs) 202, one or more network or other communications interfaces 204, memory 206, and one or more communication buses 208 for interconnecting these components. Server 102 may optionally include a graphical user interface (not shown), which typically includes a display device, a keyboard, and a mouse or other pointing device. Memory 206 may include high-speed random access memory and may also include non-volatile memory, such as one or more magnetic disk storage devices, optical disk storage devices, flash memory devices, or other non-volatile solid state storage devices. Memory 206 may optionally include mass storage that is remotely located from CPUs 202. Memory 206 may store the following programs, modules and data structures, or a subset or superset thereof:

- Operating System 210 that includes procedures for handling various basic system services and for performing hardware dependent tasks;
- Network Communication Module (or instructions) 212 that is used for connecting server 102 to other computers (e.g., clients 104) via the one or more communications Network Interfaces 204 (wired or wireless) and one or more communications networks 106 (FIG. 1), such as the Internet, other wide area networks, local area networks, metropolitan area networks, and so on;
- Mapping Engine 220 that receives meeting-spot-related requests from and provides responses to clients 104; and
- Presentation module 248 that formats the results from mapping engine 220 for display.

Network Communication Module 212 may include the following programs, modules and data structures, or a subset or superset thereof:

- Text messaging module 214 that coordinates text messaging (e.g., instant messaging) between clients 104;
- Audio module 216 that coordinates audio communications (e.g., voice chat or VoIP) between clients 104; and
- Video module 218 that coordinates video communications (e.g., video chat) between clients 104.

In some embodiments, the text messaging, audio or voice communications, and/or video communications between clients 104 are performed in a manner that does not require the use of server 102, such as via peer-to-peer networking.

Mapping Engine 220 may include the following programs, modules and data structures, or a subset or superset thereof:

Map database 224 that stores mapping data;

Meeting spot database 226 that stores records 228 for meeting spots (e.g., records 228-1, 228-2 and 228-x for meeting spots 1, 2 and x, respectively); and User database 238 that stores records 240 for users (e.g., records 240-1, 240-2, 240-7 for Users 1, 2 and y, respectively)

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows server 102 as a number of discrete items, FIG. 2 is intended more as a functional description of the various features which may be present in server 102 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers in server 102 and how features are allocated among them will vary from one implementation to another, and may depend in part on the amount of data traffic that the system must handle during peak usage periods as well as during average usage periods.

Figure 3A:
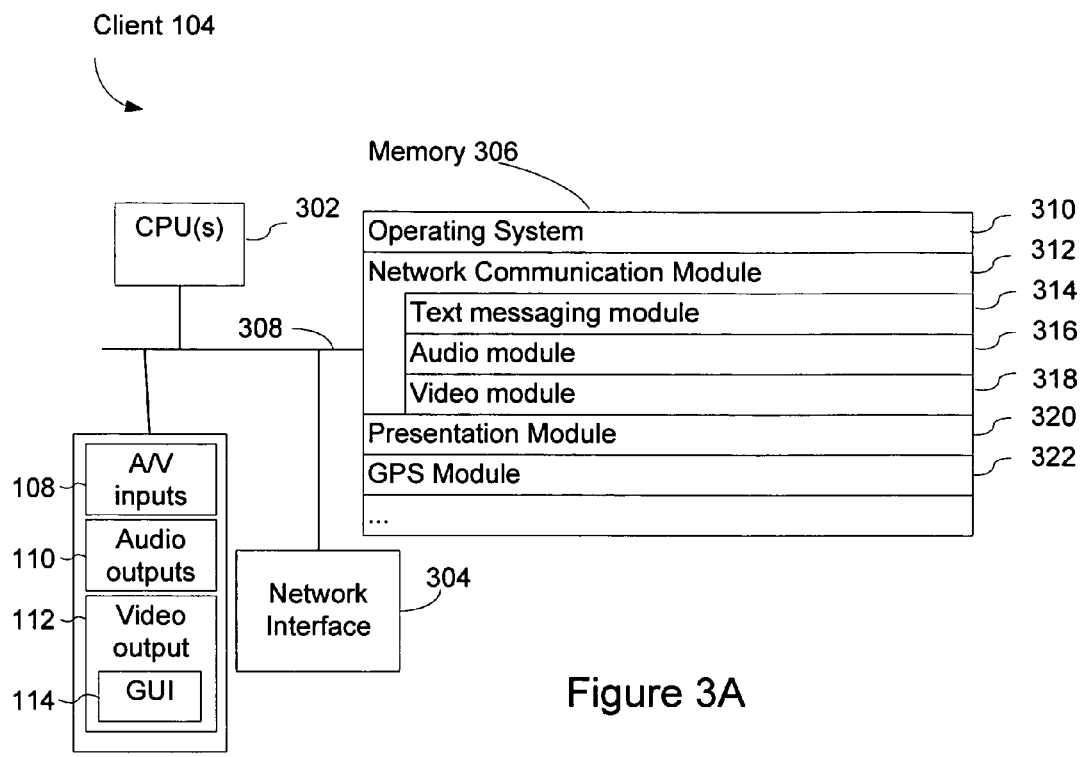
FIGS. 3A and 3B are block diagrams illustrating two exemplary clients.
Figure 3B:
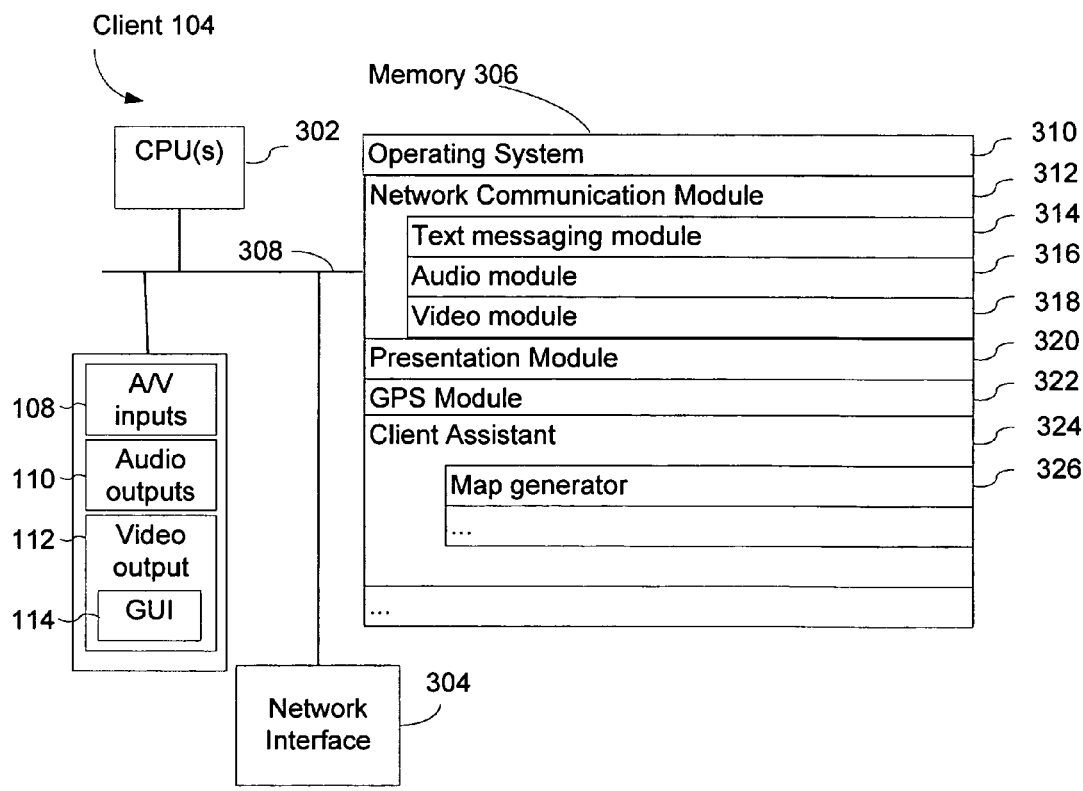

FIGS. 3A and 3B are block diagrams illustrating two exemplary clients 104. As noted above, client 104 typically includes audio/video inputs 108 (e.g., a microphone and a video camera), audio output 110 (e.g., speakers or headphones), and video output 112 (e.g., a display). Video output 112 displays graphical user interface (GUI) 114. Client 104 typically includes one or more processing units (CPUs) 302, one or more network or other communications interfaces 304, memory 306, and one or more communication buses 308 for interconnecting these components. Memory 306 may include high-speed random access memory and may also include non-volatile memory, such as one or more magnetic disk storage devices, optical disk storage devices, flash memory devices, or other non-volatile solid state storage devices. Memory 306 may store the following programs, modules and data structures, or a subset or superset thereof:

Operating System 310 that includes procedures for handling various basic system services and for performing hardware dependent tasks;

Network Communication Module (or instructions) 312 that is used for connecting client 104 to other computers (e.g., server 102 and other clients 104) via the one or more communications Network Interfaces 304 (wired or wireless) and one or more communication networks 106 (FIG. 1), such as the Internet, other wide area networks, local area networks, metropolitan area networks, and so on;

Presentation Module 320, for formatting the maps, meeting spots, and other data (e.g., user icons and text chat) for display in GUI 114;

Global Positioning System (GPS) Module (or instructions) 322 for determining the location of client 104; and Client Assistant 324, which handles data formatting and/or management tasks, at least some of which could also be handled by Mapping Engine 220.

Network Communication Module 312 may include the following programs, modules and data structures, or a subset or superset thereof:

Text messaging module 314 that supports text messaging (e.g., instant messaging) between clients 104;

Audio module 316 that supports audio communications (e.g., voice chat or VoIP) between clients 104; and Video module 318 that supports video communications (e.g., video chat) between clients 104.

As illustrated schematically in FIG. 3B, client 104 can incorporate modules, applications, and instructions for performing a variety of mapping related processing tasks (e.g., map generator 326), at least some of which could be handled by Mapping Engine 220 in server 102 instead. Alternatively, in some embodiments, client 104 can contain less functionality than shown in FIG. 3A. For example, in some embodiments, client 104 need not have a GPS Module 322.

Figure 4:
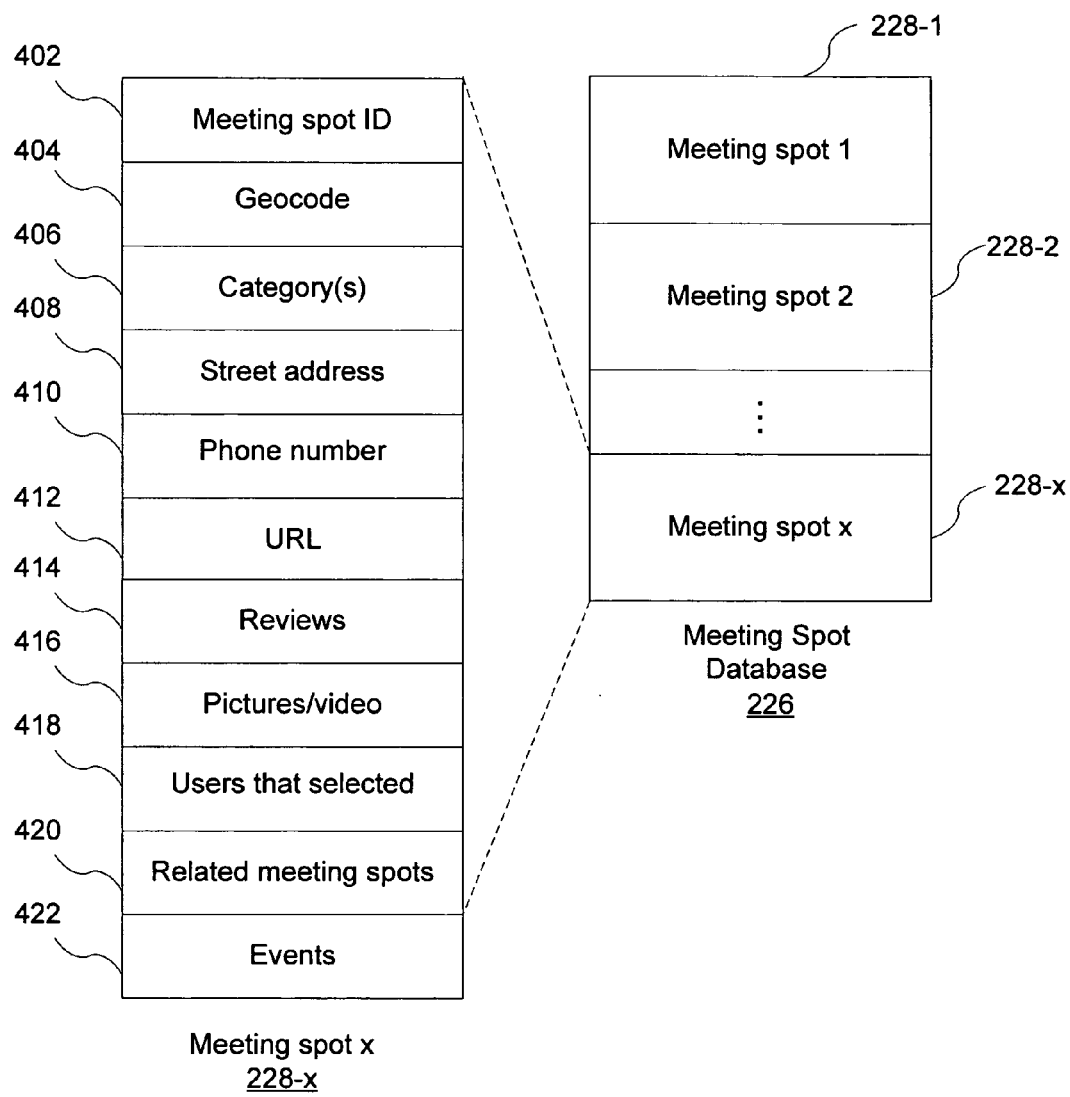
FIG. 4 is a block diagram illustrating an exemplary meeting spot database and an exemplary meeting spot record in accordance with one embodiment of the invention.

FIG. 4 is a block diagram illustrating an exemplary meeting spot database 226 and an exemplary meeting spot record 228 in accordance with one embodiment of the invention. Meeting Spot Database 226 stores meeting spot records 228, for example meeting spot 1 (228-1) through meeting spot x (228-x), where x may represent the number of meeting spots.

A meeting spot record (e.g., meeting spot x 228-x) may include the following data, or a subset or superset thereof:

Meeting spot ID 402 that uniquely identifies a particular meeting spot (e.g., an n-bit binary number);

Geocode 404 that corresponds to the location of the meeting spot;

Category(s) 406 that classify the meeting spot (e.g., dining, exercising, partying, playing, shopping, or watching);

Street address 408 for the meeting spot;

Phone number 410 for the meeting spot;

URL 412 for a web page or site associated with the meeting spot;

Reviews 414 of the meeting spot by users and/or professional reviewers, or the URL or a link to a web page or site that hosts such reviews);

Pictures/videos 416 of the meeting spot, or the URL or a link to a web page or site that hosts such reviews;

Users IDs of users that have selected the meeting spot 418;

Meeting spot IDs of other meeting spots 420 that are related to the meeting spot associated with meeting spot ID 402 (e.g., other nearby meeting spots); and Events 422 that includes dates and times for events occurring at the meeting spot.

In some embodiments, events 422 permit a temporal component to be added to meeting spots. In some embodiments, a user can tag, enter, or otherwise select particular past, present, or future events at meeting spots. Thus, a meeting-spot-based user interest profile 508 can also include particular events at meeting spots that the user has selected. User-selected events can change the similarity scores between the computer user and other computer users and, correspondingly, the display of information concerning the other computer users. For example, information about other users 932 that have selected some of the same events as the user may be displayed more prominently (e.g., at higher display positions in a list 960).

Figure 5:
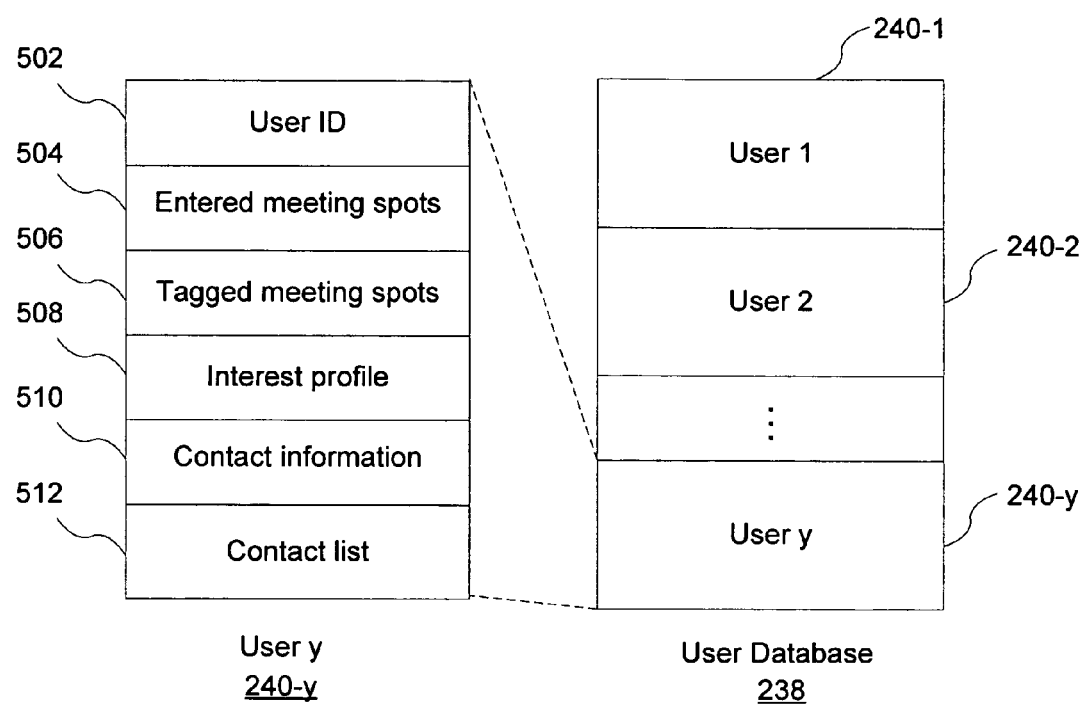
FIG. 5 is a block diagram illustrating an exemplary user database and an exemplary record for a particular user in accordance with one embodiment of the invention.

FIG. 5 is a block diagram illustrating an exemplary user database 238 and an exemplary record 240-y for a particular user in accordance with one embodiment of the invention. User Database 238 stores user records 240, for example User 1 (240-1) through User y (240-y), where y may represent the number of users.

A user record 240 (e.g., record 240-*y* for User y) may include the following data, or a subset or superset thereof:

User ID 502 that uniquely identifies a particular user (e.g., an n-bit binary number);

Entered meeting spots 504, e.g., meeting spot IDs that correspond to meeting spots that the user has chosen to enter;

Tagged meeting spots 506, e.g., meeting spot IDs that correspond to meeting spots that the user has chosen to tag (e.g., to tag as a favorite meeting spot);

Interest profile 508 for the user that is based at least in part on the meeting spots selected by the user (e.g., by entering and/or tagging);

Contact information 510 for the user (e.g., online communications address(es), and/or phone number(s) for the user); alternately, this field 510 of the user record may contain a link to the user's contact information; and Contact list 512 for the user that contains the contact information of other users known to the user; alternately, this field 512 of the user record may contain a link to the user's contact list (e.g., in messaging server 118).

As used herein, "entered meeting spots" are meeting spots in a GUI that a user has presently selected. For example, the user may be exploring meeting spots that the user has not visited before (e.g., to see which other users have also currently selected the corresponding meeting spot in their GUI). As used herein, "tagged meeting spots" are meeting spots in a GUI that the user has tagged or otherwise labeled, independent of whether the user has currently selected (entered) the tagged meeting spot. By analogy to web browsing, a user may have currently selected several web pages for viewing (e.g., via tabbed browsing or multiple windows) and some of those web pages may have been bookmarked by the user. In this analogy, entered meeting spots are analogous to currently selected web pages and tagged meeting spots are analogous to bookmarked web pages. Both entered meeting spots and tagged meeting spots can be used to determine a user's interest profile. In some embodiments, a user' interest profile is updated in real time as the user enters and leaves meeting spots and/or as the user tags and untags meeting spots.

Figure 6:
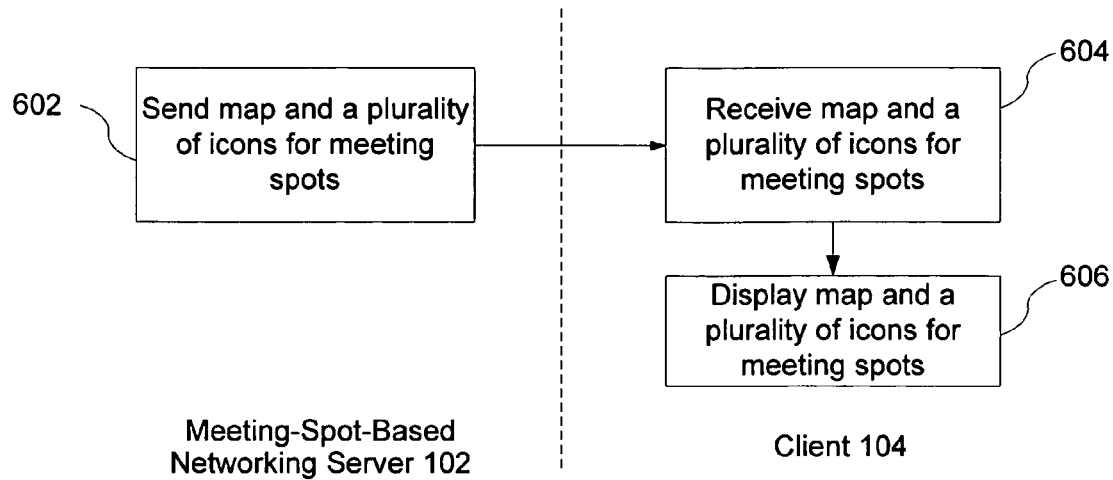
FIG. 6 is a flowchart representing a method of using maps of meeting spots to facilitate or initiate online communications in accordance with one embodiment of the present invention.

FIG. 6 is a flowchart representing a method of using maps of meeting spots to facilitate or initiate online communications in accordance with one embodiment of the present invention. FIG. 6 shows processes performed by server 102 and client 104. It will be appreciated by those of ordinary skill in the art that one or more of the acts described may be performed by hardware, software, or a combination thereof, as may be embodied in one or more computing systems. In some embodiments, portions of the processes performed by server 102 can be performed by client 104 using components analogous to those shown for server 102 in FIG. 2.

Server 102 sends (602) a map to client 104 along with a plurality of icons for meeting spots that are to be overlaid on the map when displayed at the client. In some embodiments, the map and icons are sent using a single data structure, while in other embodiments the map and the icons are sent using distinct data structures—in which case the map and icon images are merged during the display process. In some embodiments, the map and the plurality of meeting spot icons are generated by mapping engine 220 using data in mapping database 224 and meeting spot database 226.

Client 104 receives (604) the map and the plurality of icons for meeting spots.

Client 104 displays (606) the map and the plurality of icons for meeting spots overlaid on the map in a GUI. In some embodiments, presentation module 320 (FIG. 3A) formats the received map and meeting spot icon data for display.

Figure 7:
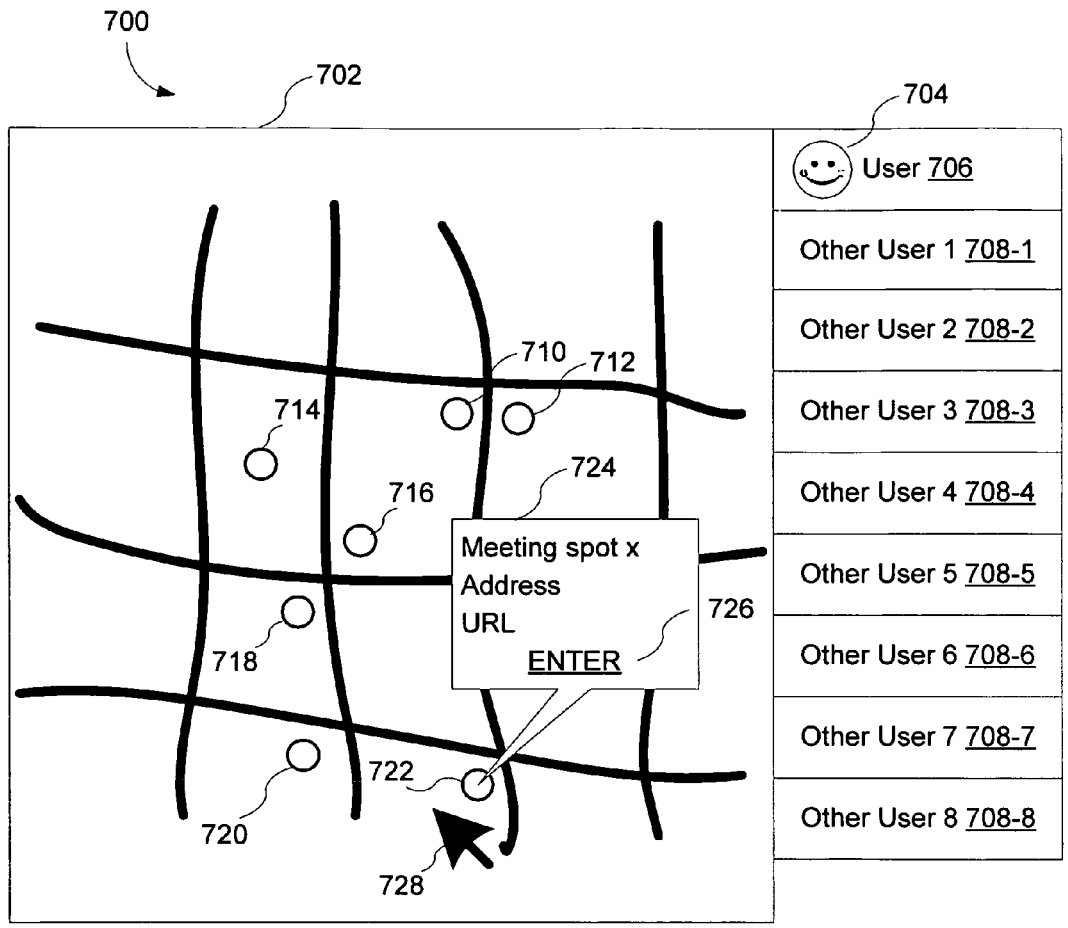
FIG. 7 is a schematic screen shot of an exemplary graphical user interface of a map with user-selectable meeting spots in accordance with one embodiment of the present invention.

FIG. 7 is a schematic screen shot of an exemplary graphical user interface of a map with user-selectable meeting spots in accordance with one embodiment of the present invention. In some embodiments, GUI 700 includes map 702, meeting spots 710-722, and icons 708 (i.e., visual elements in the GUI) with information about other users 708. In some embodiments, GUI 700 includes an icon 706 with user information (e.g., the user's screen name for online communications, and optionally an icon 704 representing the user). The information about other users contained in icons 708 may include, without limitation, the screen names for the other users and icons (e.g., thumbnails images or other icons analogous to the user's icon 704) that represent the other users in online communications.

In some embodiments, selection of a meeting spot icon (e.g., icon 710) by a user at client device 104 initiates the display of information about other users (e.g., other user icons 708 in FIG. 7) that have also selected the same meeting spot icon, thereby facilitating online communications with one or more of the other users. In some embodiments, selection of a meeting spot icon is done by the user clicking cursor 728 on the icon. In some embodiments, selection of a meeting spot icon is done by the user hovering the cursor 728 over the icon, which results in the display of more information 724 about the meeting spot and a link (e.g., ENTER link 726) that the user can activate to select the corresponding meeting spot.

In some embodiments, the meeting spot icon is selected by the user clicking on a predefined region that includes the meeting spot (e.g., clicking down and then up on a button while cursor 728 is over the meeting spot icon, or just clicking down on the button, or just clicking up on the button), placing (or hovering) cursor 728 over or near the meeting spot icon for a predetermined period of time (e.g., a mouse-hover), or other activity indicating that the user expects to activate a feature associated with the meeting spot icon. One of ordinary skill in the art would recognize various ways to identify a user-initiated activity as described above such as by recognizing a click-down event and/or click-up event, or monitoring the movement of the cursor over a period of time. This could be done, for example, by the client assistant 324 or operating system 310.

In some embodiments, selection of a meeting spot icon (e.g., icon 710) by a user at client device 104 initiates online communications (e.g., a text, audio, or video chat) with one or more other users that have also selected "the same meeting spot icon" (e.g., by selecting a corresponding meeting spot icon in a GUI on their respective client devices 104).

Figure 8A:
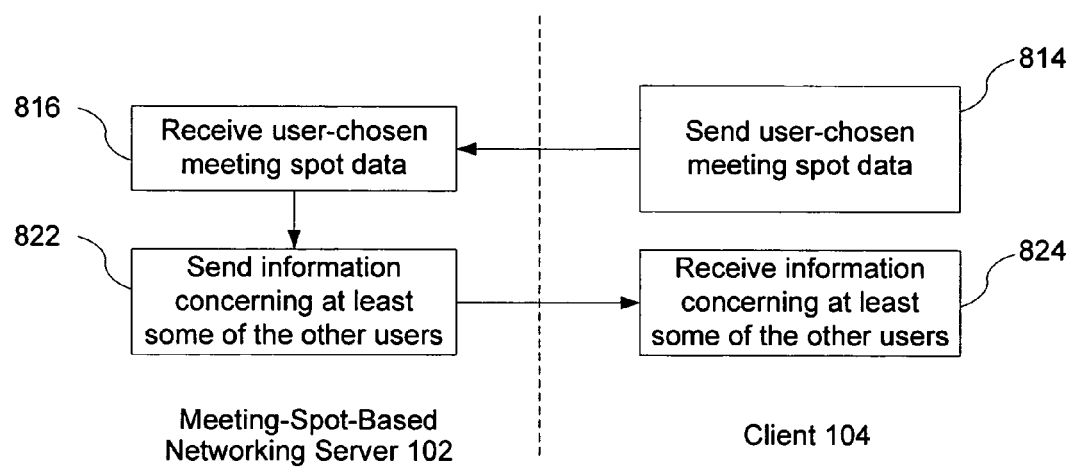
FIGS. 8A and 8B are flowcharts representing methods of using meeting spots selected by a computer user to facilitate online communications with other computer users in accordance with embodiments of the present invention.
Figure 8B:
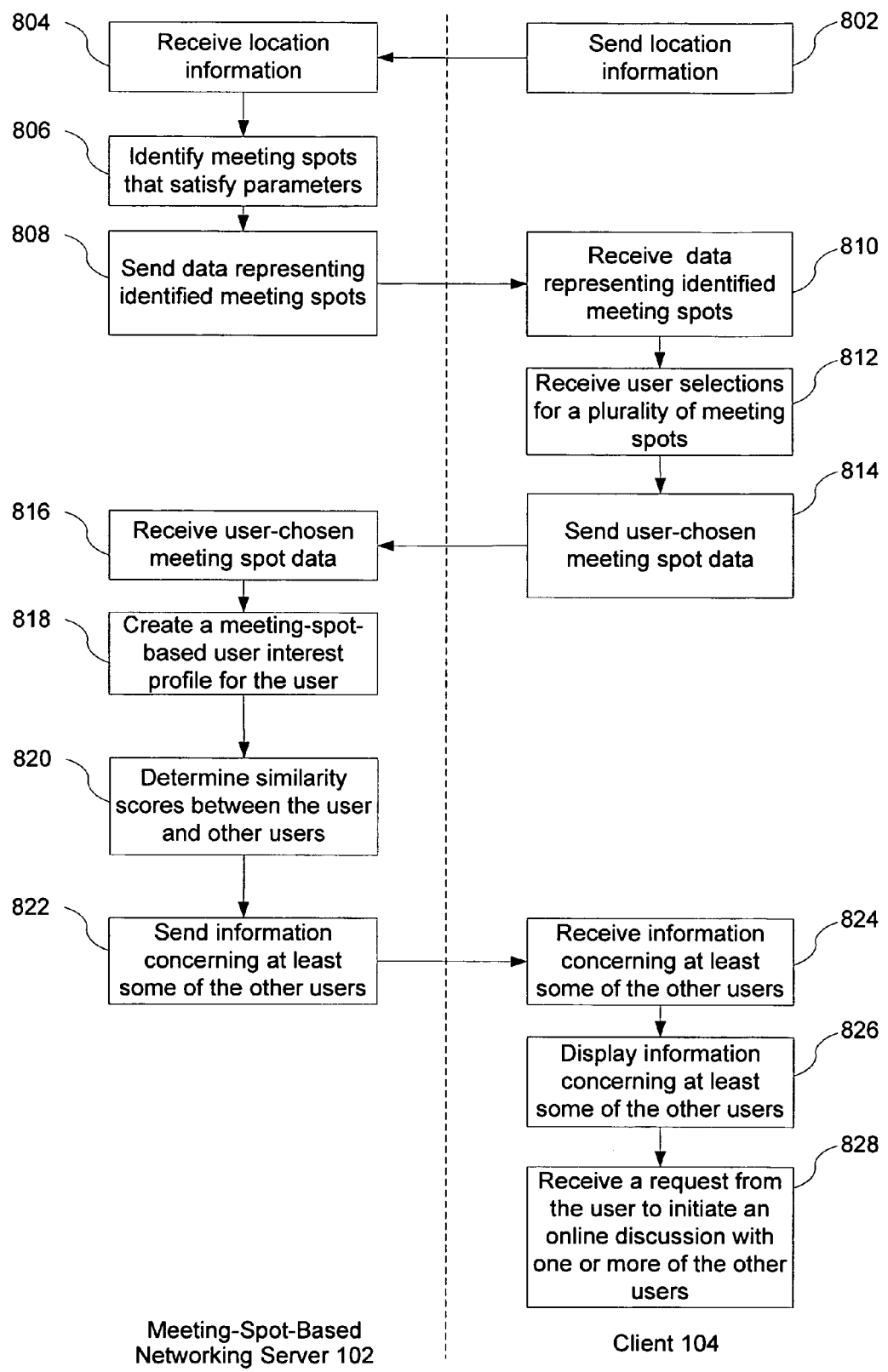

FIGS. 8A and 8B are flowcharts representing methods, performed by server 102 and client 104, of using meeting spots selected by a computer user to facilitate online communications with other computer users in accordance with embodiments of the present invention. It will be appreciated by those of ordinary skill in the art that one or more of the acts described may be performed by hardware, software, or a combination thereof, as may be embodied in one or more computing systems. In some embodiments, portions of the processes described here as being performed by server 102 can be performed instead by client 104. FIGS. 8A and 8B are further described below.

Figure 9:
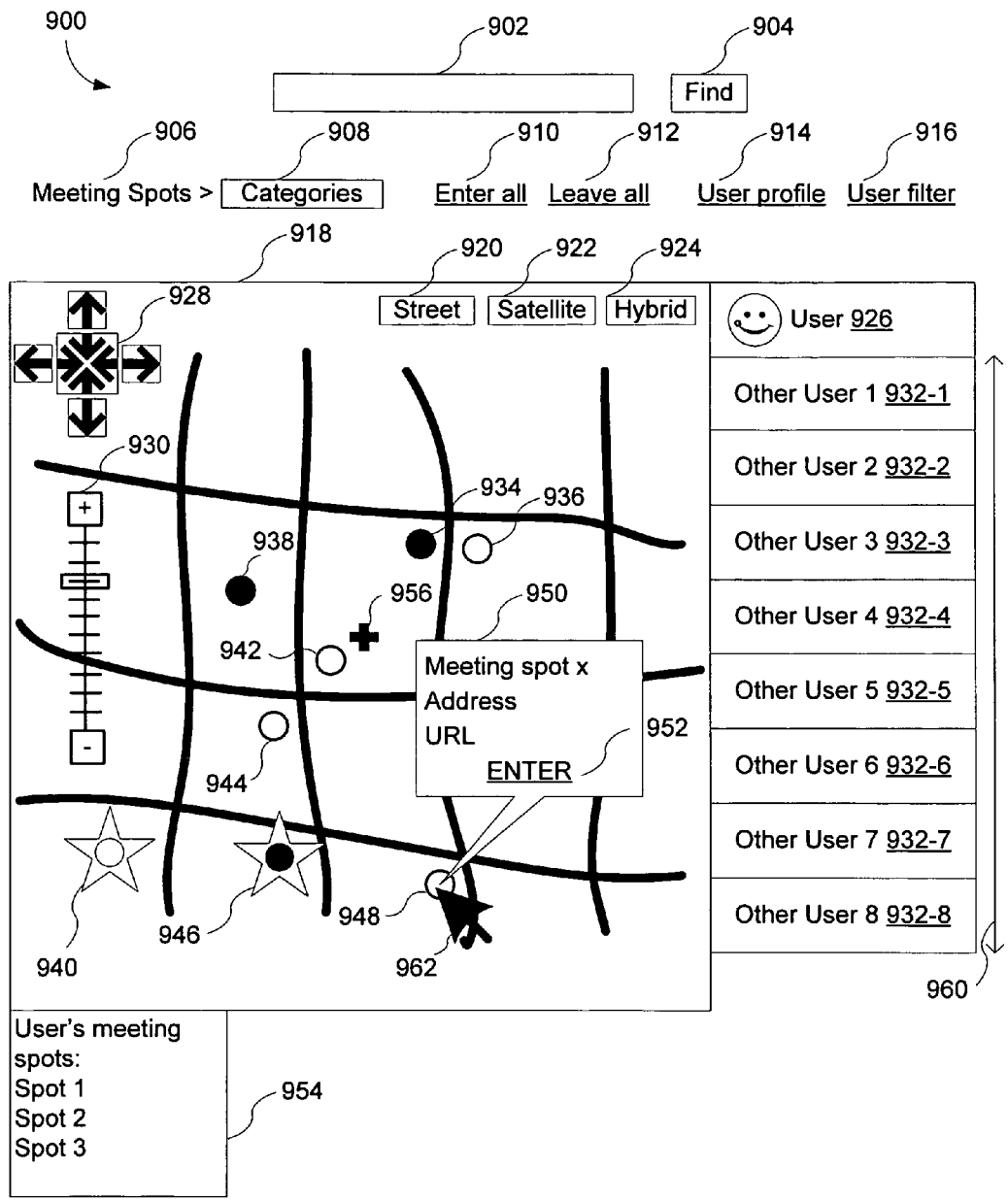
FIG. 9 is a schematic screen shot of an exemplary graphical user interface of a map with user-selectable meeting spots in accordance with one embodiment of the present invention.

FIG. 9 is a schematic screen shot of an exemplary graphical user interface 900 of a map with user-selectable meeting spots in accordance with one embodiment of the present invention. In some embodiments, GUI 900 includes the following elements, or a subset or superset thereof:

Search input box 902 for entering location information or other search query keywords;

Search initiation icon 904;

Meeting spots classifier icon 906 that, when clicked, allows a user to remove a selected category filter 908 so that more meeting spot icons are displayed;

Meeting spots categories filter 908 that lets a user choose the types of meeting spots displayed;

"Enter all" link 910 that lets a user select all of the meeting spots on the map 918;

"Leave all" link 912 that lets a user deselect all of the meeting spots in the map 918;

User profile link 914 that lets a user see and edit his or her profile 508;

User filter 916 that lets a user filter other users with whom interaction is desired (e.g., interact only with other users in the user's contact list 512; interact with anybody, including strangers; or interact with other users whose profiles satisfy one or more criteria (e.g., age range, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat"));

Map 918, which shows a drawing, diagram, and/or picture (e.g., a satellite photograph) of a geographic area;

Street view icon 920 for choosing a street view in map 918;

Satellite view icon 922 for choosing a satellite view in map 918;

Hybrid view icon 924 for choosing a hybrid view of both street names and satellite images in map 918;

User icon 926 that displays information about the user (e.g., a thumbnail image or other icon that represents the user in online communications);

Pan controls 928 that move the area shown on map 918;

Zoom control 930 that changes the scale/magnification of map 918;

Icons 932 that display information (e.g., screen names and/or thumbnail images) about other users that have also selected two or more of the meeting spots selected by the computer user. (In some embodiments, the icons for other users are displayed in a list 960. In some embodiments, icons 932 display information about other users that have also selected one or more of the meeting spots selected by the computer user.);

Meeting spot icons 934-948, which may have different types of status indicators, such as: clear icons (936, 942, 944, and 948) for meeting spots that the user has not entered or selected; dark icons (934, 938, 946) for meeting spots that the user has entered or selected; and starred icons (940, 946) for meeting spots that the user has tagged as favorites. (Alternatively, different colors can be used to represent different status, such as green icons for entered meeting spots and red icons for not entered meetings spots.);

Box 950 that displays additional information about a meeting spot (e.g., when cursor 962 hovers over or clicks on a meeting spot icon (e.g., 948)) and/or permits additional user actions with respect to the meeting spot, such as entering or selecting the meeting spot by selecting link 952;

Location icon 956 that marks the location specified by the user in search box 902; and List of user's meeting spots 954 that can be a list of meeting spots that the user has currently entered, a list of meeting spots tagged by the user, a list of meeting spots that the user has currently or recently visited in the physical world (e.g., as determined by GPS tracking of the user's cell phone or other client 104).

As noted above, in some embodiments, the graphical user interface 900 may contain a subset of the features or items shown in FIG. 9. Furthermore, in some embodiments, the graphical user interface 900 may include other features or items not shown in FIG. 9.

Referring to FIGS. 8A and 8B, client 104 sends (802) location information to server 102. In some embodiments, the location information is specified by a user inputting the location information into client 104 (e.g., by the user inputting the location information into search box 902 and activating search initiation icon 904). The location information may concern the current location of the user, a potential future location of the user, or any other location chosen by the user. In some embodiments, the location information is all or part of a mailing address. In some embodiments, the location information is a zip code. In some embodiments, the location information is the position of client 104, e.g., as determined by the client 104 using GPS module 322. In yet other embodiments, the client 104 sends an IP address of the client to the server 104, which associates location information with the client's IP address. In many cases, the IP address of the client is sufficient to identify the city or zip code of the client 104, and in some cases the IP address of the client may be sufficient to identify a specific building or set of buildings (e.g., a corporate or school campus). In some embodiments, for safety and privacy, no information about the location of client 104 is sent to the server 102 without the knowledge and/or permission of the user. In such embodiments, the user can prevent the server 102 (and other users) from knowing the user's physical location.

Server 102 receives (804) the location information sent by client 104.

Server 102 identifies (806) meeting spots that satisfy one or more parameters. In some embodiments, the one or more parameters include a physical distance, or an estimated driving time relative to the location specified by the location information. In some embodiments, the one or more parameters include a type of meeting spot, such as a dining location, an exercising location, a partying location, a playing location, a shopping location, or a watching location. In some embodiments, the one or more parameters include a type of meeting spot and either a physical distance or an estimated driving time relative to the location specified by the location information. In some embodiments, the one or more parameters are keywords in a search query. In some embodiments, at least some of the parameters are selected by the user at client 104. For example, the user may select the type of meeting spot using category filter 908.

Server 102 sends (808) and client 104 receives (810) data representing the identified meeting spots. In some embodiments, the identified meeting spots are displayed in a map in a GUI (e.g., meeting spots 934-948 in map 918 in GUI 900). In some embodiments, the icons 934-948 representing meeting spots are within a predetermined distance or estimated driving time from a location on the map specified by the computer user. In some embodiments, the map is a street map, a satellite photograph, or a hybrid map showing street names superimposed on a satellite photograph.

Client 104 receives (812) user selections for a plurality of meeting spots. In some embodiments, the user selects the plurality of meeting spots using a map-based GUI (e.g., 900).

In some embodiments, selection of a meeting spot icon is accomplished by the user clicking cursor 960 on the icon. In some embodiments, selection of a meeting spot icon is accomplished by the user hovering cursor 960 over the icon, which results in the display of more information 950 about the meeting spot and a link (e.g., ENTER link 952) that the user can activate to select the corresponding meeting spot.

Client 104 sends (814) and server 102 receives (816) user-chosen meeting spot data that correspond to the plurality of meeting spots selected by the user.

In some embodiments, server 102 creates (818) a meeting-spot-based user interest profile for the user based at least in part on the plurality of meeting spots selected by the user. In some embodiments, the meeting-spot-based user interest profile for the user is created in real-time, i.e., the profile is generated and updated as the user selects meeting spots. In some embodiments, the meeting-spot-based user interest profile for the user is stored, e.g., in interest profile 508 in user record 246. In some embodiments, interest profile 508 is a list of meeting spots selected by the user. In some embodiment, interest profile 508 is a list of meeting spots selected by the user and one or more attributes concerning the user (e.g., age, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat").

In some embodiments, server 102 determines (820) similarity scores between the user and other users that have also selected two or more of the meeting spots selected by the user, wherein the similarity scores are based at least in part on the overlap in meeting-spot-based user interest profiles for the user and for the other users. In some embodiments, server 102 determines similarity scores between the user and other users that have also selected one or more of the meeting spots selected by the user. In some embodiments, the similarity score is the number of overlapping meeting spots that both users have presently entered. In some embodiments, the similarity score is the number of overlapping meeting spots that both users have presently entered divided by the total number of meeting spots that both users have presently entered. In some embodiments, the similarity score is the number of overlapping meeting spots that both users have tagged. In some embodiments, the similarity score is the number of overlapping meeting spots that both users have tagged divided by the total number of meeting spots that both users have tagged. In some embodiments, the similarity score is a combination of one of the preceding scores with a score based on the overlap in attributes of the user and the other user (e.g., age, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat").

Server 102 sends (822) and client 102 receives (824) and displays (826) information (e.g., icons 932) concerning at least some of the other users for display. In some embodiments, the display of the information 932 concerning the other users depends at least in part on the similarity scores between the user and the other users. In some embodiments, users with higher similarity scores are displayed higher (i.e., at higher display positions) than users with lower similarity scores in a list 960 of other users. In some embodiments, the similarity scores of the other users and the order in which the other users 932 are displayed in list 960 changes in real time as the user changes the meeting spots that he or she has selected (e.g., by entering or leaving meetings spots). In some embodiments, GUI icons associated with users with higher similarity scores are displayed more prominently than GUI icons associated with users with lower similarity scores. In some embodiments, GUI icons differentiate users based at least in part on the users' similarity scores.

In some embodiments, the information about other users is filtered (e.g., via user filter 916) so that only information about other users with whom interaction is desired is displayed (e.g., interact only with other users in the user's contact list 512; interact with anybody, including strangers; or interact with other users whose profiles satisfy one or more criteria (e.g., age range, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat")). In such embodiments, the "in bound" information about other users is filtered.

Conversely, in some embodiments, a user can filter the "out bound" information concerning the user (e.g., via a filter analogous to user filter 916), thereby enabling the user to control: (1) which other users are permitted to view the user's information (e.g., show the user's information only to other users in the user's contact list 512; show the user's information to anybody, including strangers; or show the user's information to other users whose profiles satisfy one or more criteria) and (2) what information about the user is communicated (e.g., the user's screen name or other contact information 510, a thumbnail image, and/or one or more user attributes in user profile 508).

In some embodiments, a user can filter or control both the "out bound" information concerning the user and the "in bound" information concerning other users.

In some embodiments, client 104 receives (828) a request from the user to initiate an online discussion or communication with one of the other users. In some embodiments, selecting an icon 932 representing another computer user initiates an online communication with the computer user represented by the selected icon 932. In some embodiments, the online communication includes instant messaging, voice communications (e.g., using VoIP), and/or video chat. In some embodiments, the user may request to initiate online communications with two or more of the other users, in effect requesting the formation of a multi-user chat room or multi-user communication.

Figure 10:
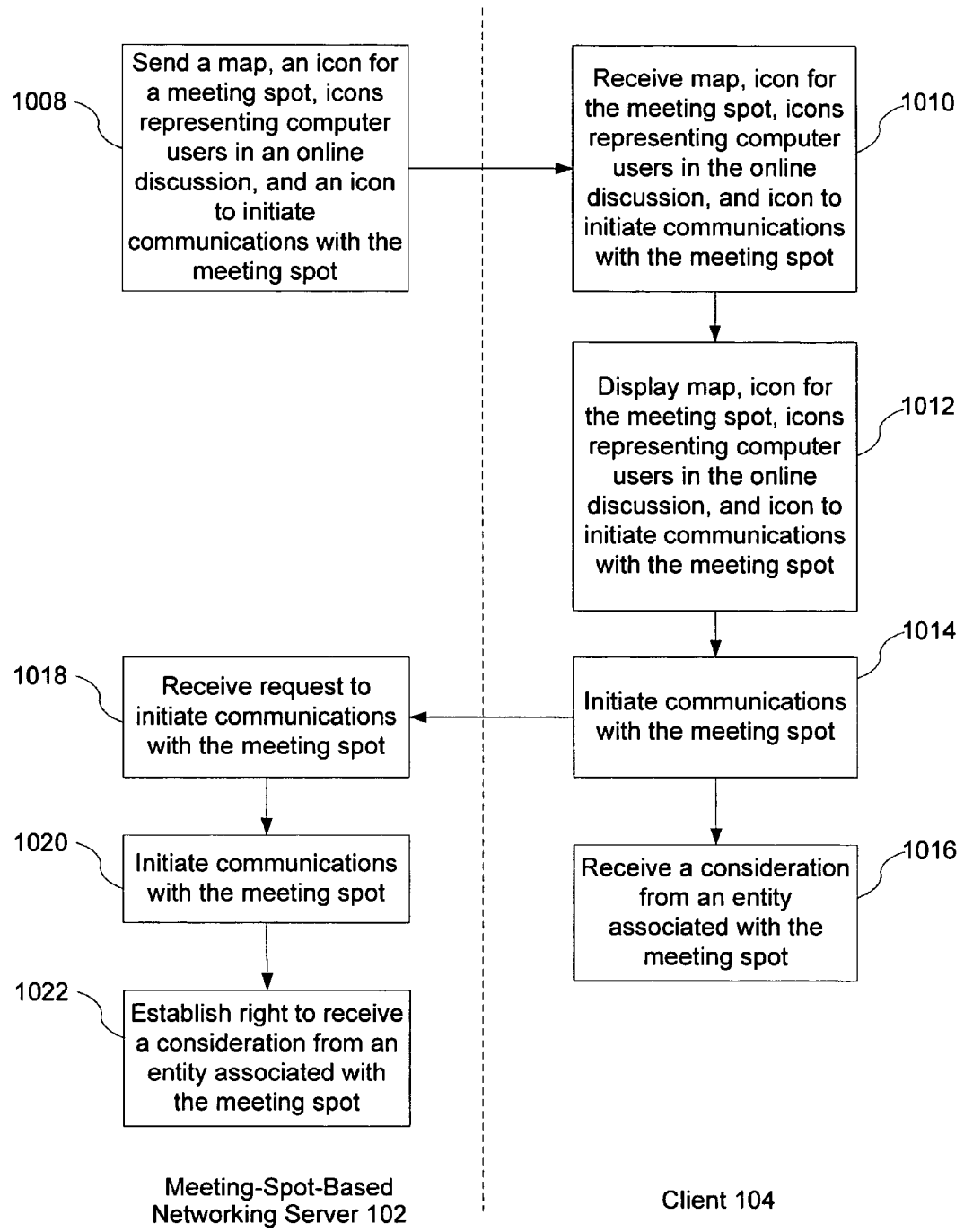
FIG. 10 is a flowchart representing a method of identifying meeting spots and communicating with meeting spots in accordance with one embodiment of the present invention.
Figure 11:
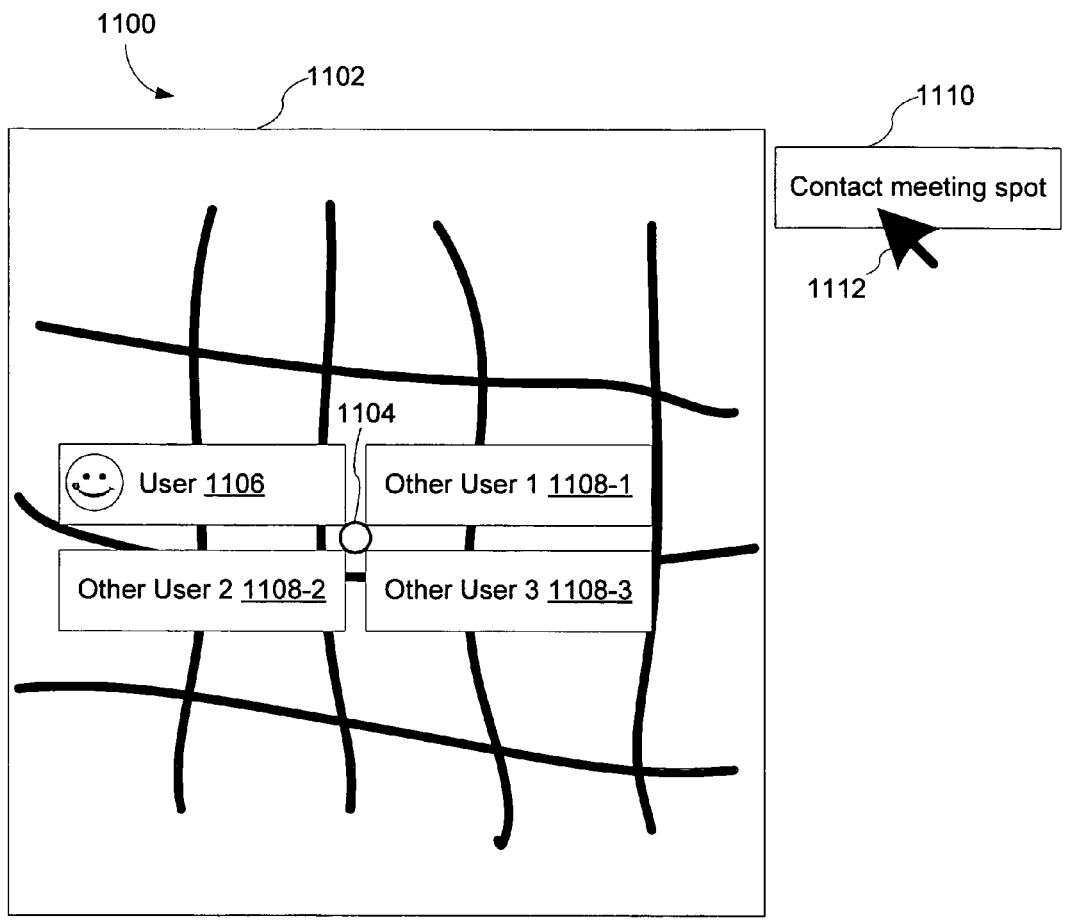
FIG. 11 is a schematic screen shot of an exemplary graphical user interface of a map with user-selectable meeting spots in accordance with one embodiment of the present invention.

FIG. 10 is a flowchart representing a method of identifying meeting spots and communicating with meeting spots in accordance with one embodiment of the present invention. FIG. 10 shows processes performed by server 102 and client 104. It will be appreciated by those of ordinary skill in the art that one or more of the acts described may be performed by hardware, software, or a combination thereof, as may be embodied in one or more computing systems. In some embodiments, portions of the processes described here as being performed by server 102 can be performed instead by client 104. FIG. 11 is a schematic screen shot of an exemplary graphical user interface of a map with user-selectable meeting spots in accordance with one embodiment of the present invention.

Server 102 sends (1008) to a plurality of client devices associated with computer users in an online discussion information corresponding to: a map 1102, an icon for a meeting spot to be overlaid on the map 1104, a plurality of icons representing at least some of the computer users in the online discussion (e.g., 1106, 1108-1, 1108-2, and 1108-3), and an icon 1110 to initiate online communications between a respective client device and a computer associated with the meeting spot. In some embodiments, the icon for the meeting spot 1104 is also the icon to initiate online communications 1110. The information corresponding to map 1102 and the various icons may be sent using a single data structure or multiple data structures that are merged for display at the client 104. In some embodiments, the information sent that corresponds to map 1102 and the various icons contains all of the data needed to display the map 1102 and the various icons in GUI 1100 on client 104. In some embodiments, the information sent that corresponds to map 1102 and/or the various icons include pointers to data stored in client 104. The pointers in combination with the data stored in client 104 can be used to display the map 1102 and the various icons in GUI 1100 on client 104.

Client 104 receives (1010) and displays (1012) the map 1102, the icon for the meeting spot 1104, the plurality of icons representing computer users (e.g., 1106, 1108-1, 1108-2, and 1108-3), and the icon 1110 to initiate online communications with the meeting spot. In some embodiments, the map 1102, the icon for the meeting spot 1104, the plurality of icons representing computer users (e.g., 1106, 1108-1, 1108-2, and 1108-3), and the icon 1110 to initiate online communications with the meeting spot are displayed in a single application window (e.g., a browser window). In some embodiments, the plurality of icons representing computer users (e.g., 1106, 1108-1, 1108-2, and 1108-3) are fully or partially overlaid on the map 1102.

Client 104 initiates (1014) online communications with the computer associated with the meeting spot in response to the computer user selecting a corresponding icon (e.g., by the user clicking on icon 1110 with cursor 1112).

In some embodiments, client 104 receives (1016) a consideration from an entity associated with the meeting spot. In some embodiments, the consideration is a discount coupon, credit coupon, or membership card. In some embodiments, the entity associated with the meeting spot is the computer associated with the meeting spot.

In some embodiments, server 102 receives (1018) a request to initiate online communications between the computer associated with the meeting spot and at least one client 104 in the online discussion.

In some embodiments, server 102 initiates (1020) online communications between the computer associated with the meeting spot and at least one client 104 in the online discussion.

In some embodiments, server 102 establishes (1022) a right to receive a consideration from an entity associated with the meeting spot. In some embodiments, the consideration is a referral fee or a commission. Establishing a right to receive consideration may be accomplished, for example, by posting an entry to an account that will reconciled or otherwise processed at a later time. In some embodiments, the entity associated with the meeting spot is the computer associated with the meeting spot. In some embodiments, the server 102 receives the aforementioned consideration (i.e., participates in a funds transfer, in real time) instead of establishing a right to receive that consideration at 1022.

Figure 12:
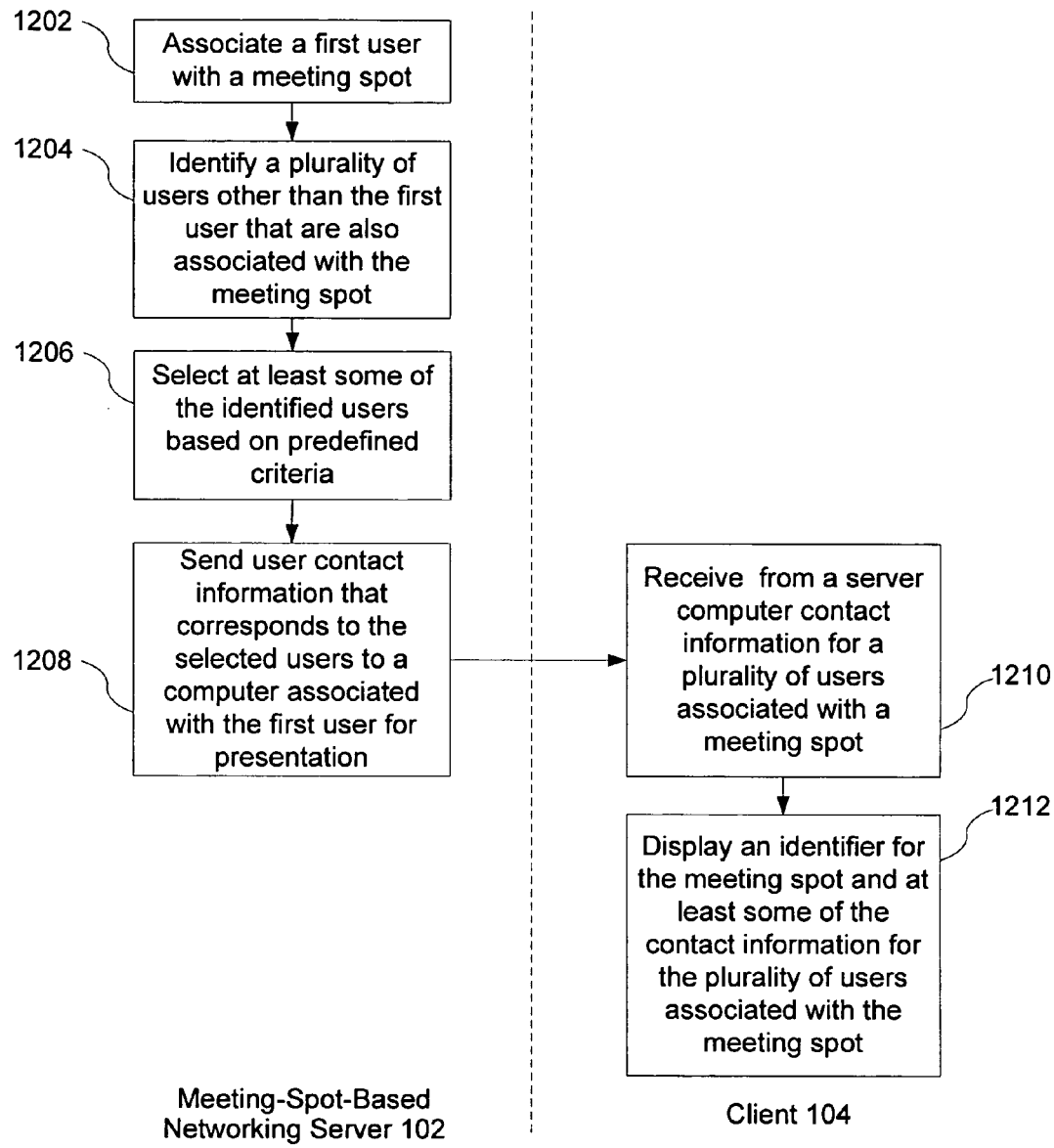
FIG. 12 is a flowchart representing a method of generating meeting-spot-related contact lists in accordance with embodiments of the present invention.

FIG. 12 is a flowchart representing a process or method, performed by server 102 and client 104, of generating meeting-spot-related contact lists in accordance with embodiments of the present invention. It will be appreciated by those of ordinary skill in the art that one or more of the acts described may be performed by hardware, software, or a combination thereof, as may be embodied in one or more computing systems. In some embodiments, portions of the processes described here as being performed by server 102 can be performed instead by client 104 or by messaging server(s) 118.

A first user is associated (1202) with a meeting spot. In some embodiments, the first user is associated with the meeting spot by a reference to the meeting spot in a record for the first user. A meeting spot ID 402 that corresponds to the meeting spot may be included in the first user's record 240, e.g., in the first user's entered meeting spots 504 and/or the first user's tagged meeting spots 506. In some embodiments, the reference to the meeting spot is added to the record for the first user when the first user activates an icon corresponding to the meeting spot. In some embodiments, the icon (e.g., 934-948) corresponding to the meeting spot is displayed on a digital map (e.g., 918).

The process identifies a plurality of users other than the first user (1204) who are also associated with the meeting spot. In some embodiments, the plurality of users are identified by respective identifiers for the meeting spot 402 in respective records 240 for the plurality of users. For example, the meeting spot ID 402 may be included in the respective records 240 for the plurality of users in the entered meeting spots 504 and/or the tagged meeting spots 506. In some embodiments, the plurality of users are identified via the user IDs listed in field 418 of the meeting spot record 228.

At least some of the identified users are selected (1206) based on predefined criteria. In some embodiments, the predefined criteria include that the identified user is currently online. In some embodiments, the predefined criteria include that the identified user is active. In some embodiments, the identified user must satisfy one or more criteria (e.g., age range, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat")).

User contact information that corresponds to the selected users is sent (1208) to a client device 104 associated with the first user for presentation. In some embodiments, the user contact information is sent for display in a list, e.g., other user information 932 in list 960. In some embodiments, the user contact information is sent for display in a contact list 1302 of the first user.

A client device 104 may be permanently associated with the first user (e.g., by a telephone number or IP address) or the client device 104 may be intermittently associated with the first user (e.g., by the user logging in and out of a communications application (e.g., 314, 316, or 318) on the client device 104).

The client device 104 associated with the first user receives (1210) from a server computer contact information for a plurality of users associated with a meeting spot. In some embodiments, as described above, the first user is also associated with the meeting spot.

The client device 104 associated with the first user displays (1212) an identifier 1304 for the meeting spot and at least some of the contact information for the plurality of users associated with the meeting spot. In some embodiments, the identifier 1304 and the at least some contact information is displayed in a contact list 1302 of the first user.

Figure 13A:
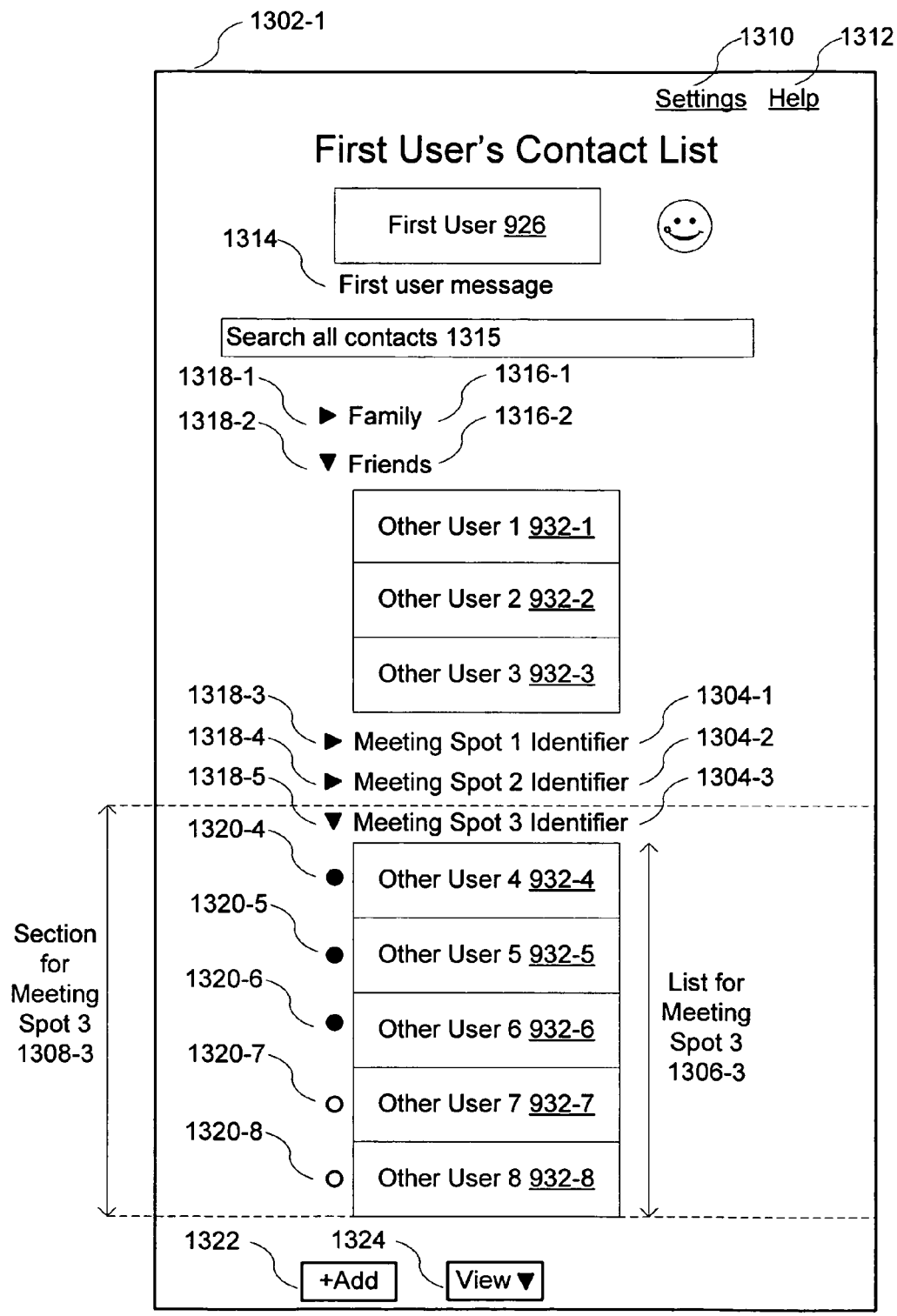
FIGS. 13A-13C are schematic screen shots of exemplary graphical user interfaces that include meeting-spot-related contact lists in accordance with embodiments of the present invention.
Figure 13B:
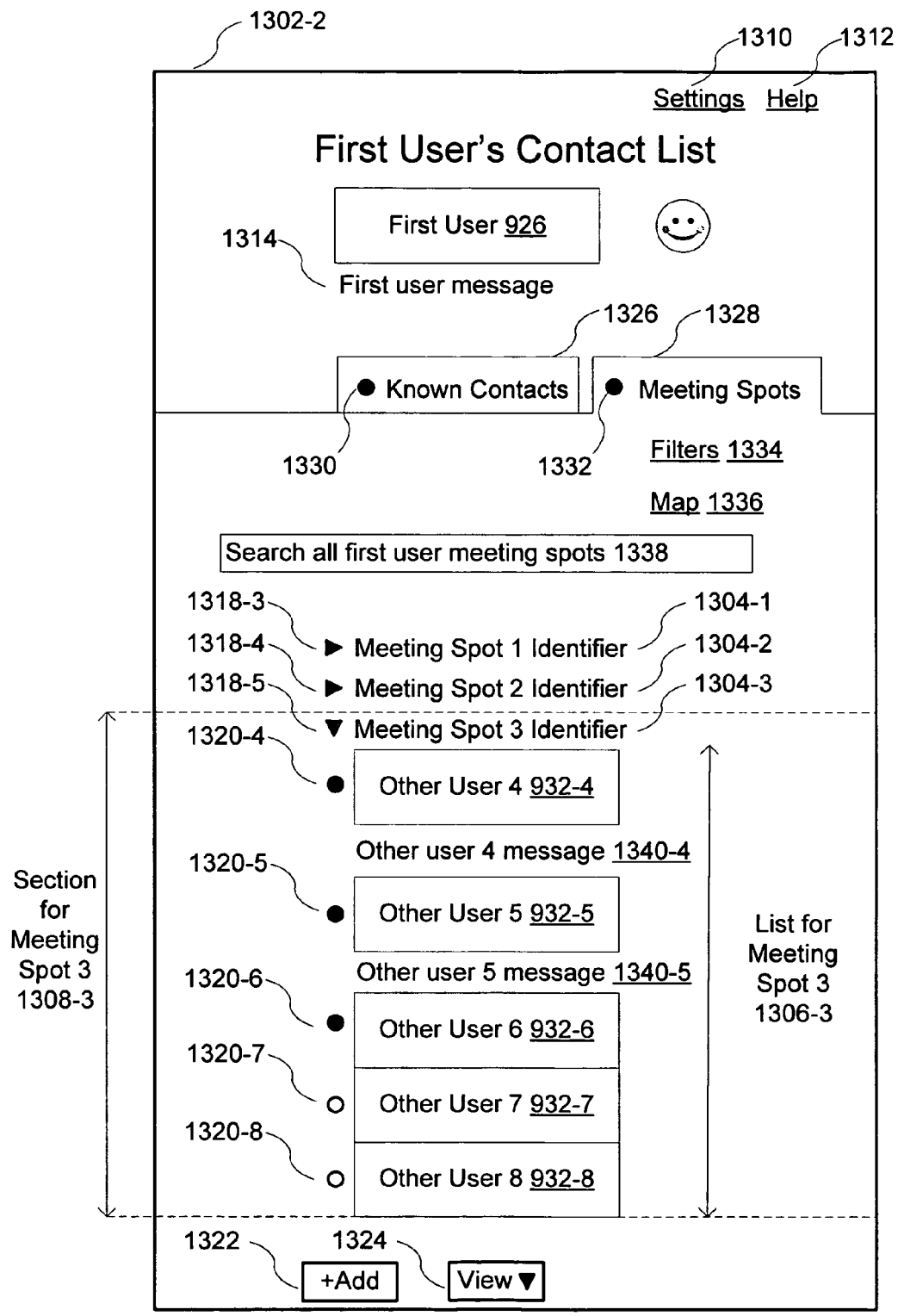
Figure 13C:
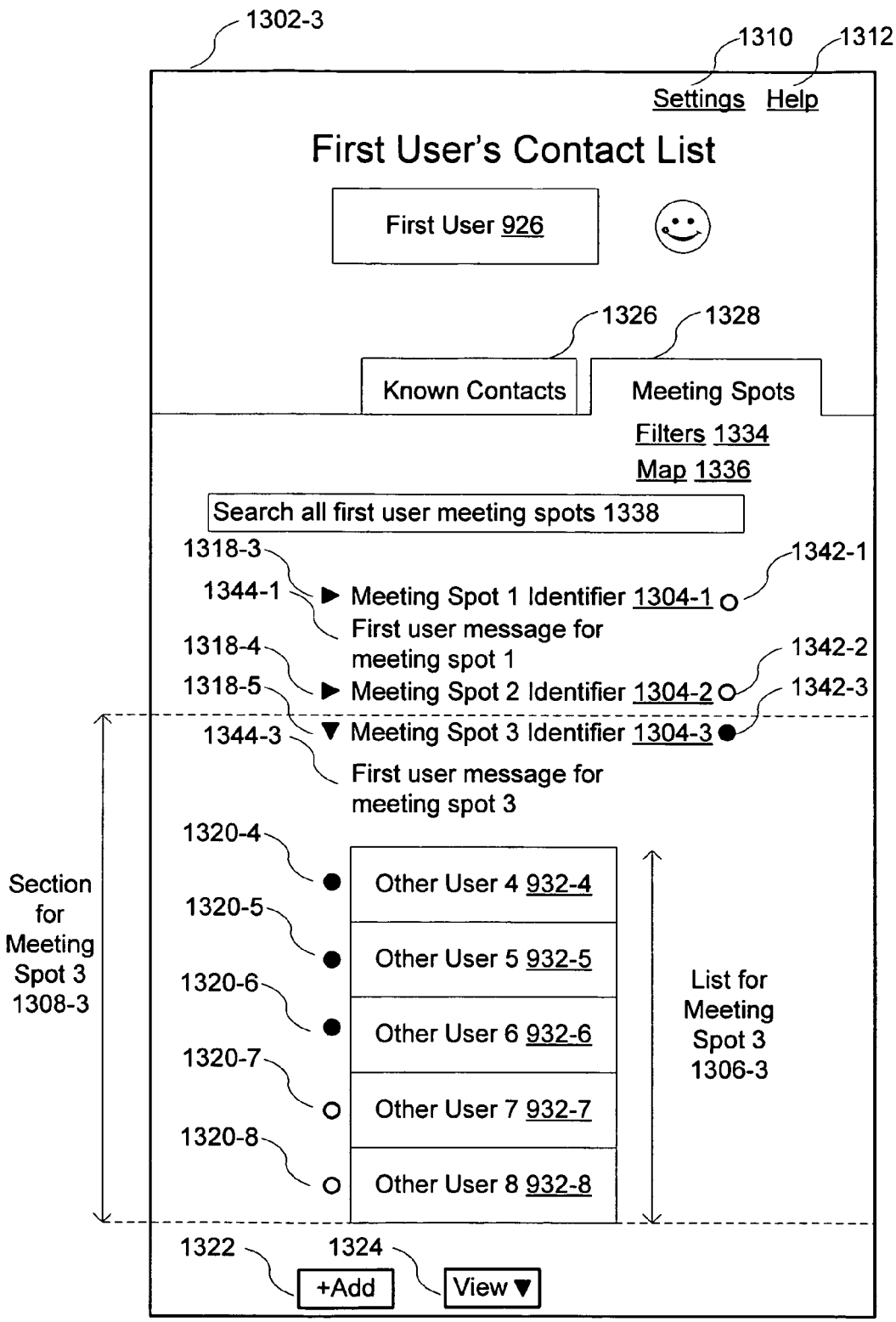

FIGS. 13A-13C are schematic screen shots of exemplary graphical user interfaces (GUIs) that include meeting-spot-related contact lists 1302 in accordance with embodiments of the present invention.

In some embodiments, such GUIs include the following elements, or a subset or superset thereof:

First user information icon 926 that displays information about the first user, such as contact information, that may be displayed to other users' (e.g., in list 960 or contact list 1302)

Other user information icons 932 that display information, such as screen names and other contact information, about other users. (In some embodiments, the icons 932 for other users are links that initiate online communications with the corresponding other users.);

Meeting spot identifier(s) 1304, such as a name or logo for a meeting spot;

List(s) 1306 of contact information about other users 932 that are associated with corresponding meeting spot(s);

Section(s) 1308 of contact list 1302 that, for a given meeting spot, includes the list 1306 of contact information about other users 932 that are associated with the meeting spot and a section heading that includes the meeting spot identifier 1304;

Settings icon 1310 that links the user to user preferences;

Help icon 1312 that links to information for setting up, maintaining, and using a contact list 1302;

First user message 1314 that shows a message that may appear in other users' contact lists 1302 that include contact information 926 for the first user;

Search box 1315 for entering search terms to search for in the user's contact list 1302;

Identifiers 1316 for other sections of contact list 1302 besides meeting spot sections 1308, such as family 1316-1 and friends 1316-2;

Expand/collapse icons 1318 for expanding and collapsing sections of contact list 1302 (e.g., in FIG. 13A, the sections corresponding to 1318-1, 1318-3, and 1318-4 are collapsed and the sections corresponding to 1318-2, and 1318-5 are expanded);

Online status icons 1320 that indicate (e.g., by icon shape, color, and/or filling) the availability of the corresponding user for online communications;

Add icon 1322 for adding new sections and/or users to the contact list 1302;

View icon 1324 for selecting what and/or how information is shown in list 1302 (e.g., show one page, sort by name, show pictures, show offline friends, etc.);

Tab 1326 (FIGS. 13B, 13C) that activates, when selected, display of portions of the contact list 1302 that are not concerned with meeting spots;

Meeting spot tab 1328 (FIGS. 13B, 13C) that activates, when selected, display of portions of the contact list 1302 that are concerned with meeting spots (e.g., 1304, 1306, and/or 1308);

Online status icon 1330 that indicates (e.g., by icon shape, color, and/or filling) whether any of the users in the portions of the contact list 1302 corresponding to tab 1326 are available for online communications;

Online status icon 1332 that indicates (e.g., by icon shape, color, and/or filling) whether any of the users in the portions of the contact list 1302 corresponding to tab 1328 are available for online communications;

Filters icon 1334 that links to a screen that enables a user to select what inbound and/or outbound filters are applied to the display of other users information 932 in one or more meeting spot sections 1308 in contact list 1302;

Map icon 1336 that links to a map (e.g., 918) that displays meeting spots (e.g., at least some of the meeting spots associated with the first user) and/or permits a user to add meeting spots;

Search box 1338 for entering search terms to search for in meeting spots associated with the first user, including other user information associated with such meeting spots;

Messages from other users 1340 that are analogous to first user message 1314;

Online status icon(s) 1342 that indicates (e.g., by icon shape, color, and/or filling) whether any of the other users associated with a given meeting spot are available for online communications; and First user message 1344 that shows a message that may appear in other users' contact lists 1302 that include the same meeting spot;

Note that first user message 1314 is a global message that may be displayed in other users' contact lists (e.g., "I'm back in town."), whereas first user message 1344 is a message from the first user that may be displayed to other users of a particular meeting spot (e.g., "I'll be at meeting spot 3 tonight at 8 PM.")

As noted above, in some embodiments, graphical user interfaces that include meeting-spot-related contact lists 1302 may contain a subset of the features or items shown in FIGS. 13A-13C. Furthermore, in some embodiments, such graphical user interfaces may include other features or items not shown in FIGS. 13A-13C.

Graphical user interfaces (e.g., on client 104) include: a contact list 1302 for a first user; in the contact list 1302, an identifier 1304 for a meeting spot; and a list 1306 of contact information for a plurality of users that are associated with the meeting spot.

In some embodiments, identifier 1304 is a name or logo for the meeting spot.

In some embodiments, the contact list 1302 is divided into sections 1308 and the list of contact information 1306 is included in a section having a section heading comprising the identifier for the meeting spot 1304. In some embodiments, the list 1306 of contact information is adjacent to the identifier 1304 for the meeting spot.

In some embodiments, the list 1306 of contact information includes links for the plurality of users. In some embodiments, activation of a link for a particular user initiates online communications with the particular user.

In some embodiments, the meeting spot is associated with the first user, e.g., by a reference to the meeting spot in a record for the first user. A meeting spot ID 402 that corresponds to the meeting spot may be included in the first user's record 240, e.g., in the first user's entered meeting spots 504 and/or the first user's tagged meeting spots 506. In some embodiments, the reference to the meeting spot is added to the record for the first user when the first user activates an icon (e.g., 934-948) corresponding to the meeting spot. In some embodiments, the icon corresponding to the meeting spot is displayed on a digital map (e.g., 918).

In some embodiments, the meeting spot is associated with the plurality of users by respective identifiers for the meeting spot 402 in respective records 240 for the plurality of users. For example, the meeting spot ID 402 may be included in the respective records 240 for the plurality of users, in the entered meeting spots 504 and/or the tagged meeting spots 506. In some embodiments, the meeting spot is associated with the plurality of users by respective user IDs for the plurality of users in field 418 of the meeting spot record 228.

Figure 14:
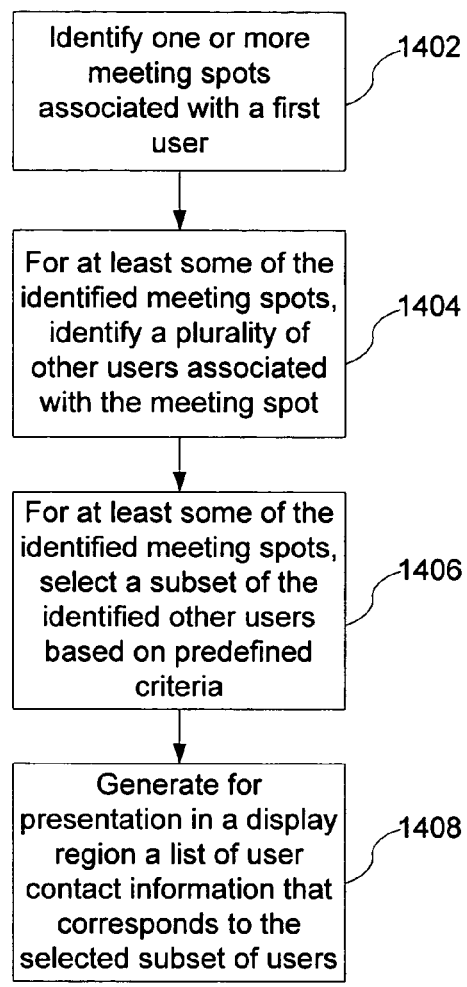
FIG. 14 is a flowchart representing a method of generating meeting-spot-related contact lists in accordance with embodiments of the present invention.

FIG. 14 is a flowchart representing a method of generating meeting-spot-related contact lists in accordance with embodiments of the present invention. The method may be performed entirely by server 102; entirely by client 104; or by server 102 in part, and by client 104 in part. Alternately, the method may be performed, at least in part, by messaging servers 118. It will be appreciated by those of ordinary skill in the art that one or more of the acts described may be performed by hardware, software, or a combination thereof, as may be embodied in one or more computing systems.

One or more meeting spots associated with a first user are identified (1402). In some embodiments, at least two meeting spots are identified. In some embodiments, the first user is associated with the meeting spot by a reference to the meeting spot in a record for the first user. A meeting spot ID 402 that corresponds to the meeting spot may be included in the first user's record 240, e.g., in the first user's entered meeting spots 504 and/or the first user's tagged meeting spots 506. In some embodiments, the reference to the meeting spot is added to the record for the first user when the first user activates an icon corresponding to the meeting spot. In some embodiments, the icon (e.g., 934-948) corresponding to the meeting spot is displayed on a digital map (e.g., 918).

For at least some of the identified meeting spots, a plurality of other users associated with the meeting spot are identified (1404). In some embodiments, the plurality of users are identified by respective identifiers for the meeting spot in respective records 240 for the plurality of users. For example, the meeting spot ID 402 may be included in the respective records 240 for the plurality of users who have "entered" or tagged the corresponding meeting spot 228. In some embodiments, the plurality of users are identified via the user IDs listed in field 418 of the meeting spot record 228.

For at least some of the identified meeting spots, a subset of the identified other users based on predefined criteria is selected (1406). In some embodiments, the predefined criteria include that the identified user is currently online. In some embodiments, the predefined criteria include that the identified user is active. In some embodiments, the identified user must satisfy one or more criteria (e.g., age range, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat")).

A list of user contact information that corresponds to the selected subset of users is generated (1408) for presentation in a display region (e.g., list 1306).

Figure 15:
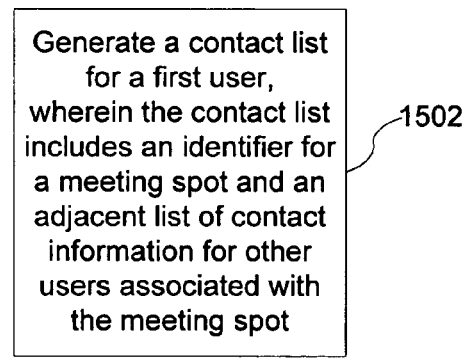
FIG. 15 is a flowchart representing a method of generating meeting-spot-related contact lists in accordance with embodiments of the present invention.

FIG. 15 is a flowchart representing a method of generating meeting-spot-related contact lists in accordance with embodiments of the present invention. In some embodiments, the method is performed by a client device associated with the first user. In some embodiments, the method is performed by a server computer remote from a client device associated with the first user. The method may be performed entirely by server 102; entirely by client 104; or by server 102 in part, and by client 104 in part. Alternately, the method may be performed, at least in part, by messaging servers 118. It will be appreciated by those of ordinary skill in the art that one or more of the acts described may be performed by hardware, software, or a combination thereof, as may be embodied in one or more computing systems.

A contact list 1302 for a first user is generated (1502). The contact list includes an identifier 1304 for a meeting spot and an adjacent list 1306 of contact information for other users associated with the meeting spot.

In some embodiments, the first user is also associated with the meeting spot. In some embodiments, the first user is associated with the meeting spot by a reference to the meeting spot in a record for the first user. A meeting spot ID 402 that corresponds to the meeting spot may be included in the first user's record 240, e.g., in the first user's entered meeting spots 504 and/or the first user's tagged meeting spots 506. In some embodiments, the reference to the meeting spot is added to the record for the first user when the first user activates an icon corresponding to the meeting spot. In some embodiments, the icon (e.g., 934-948) corresponding to the meeting spot is displayed on a digital map (e.g., 918).

Figure 16:
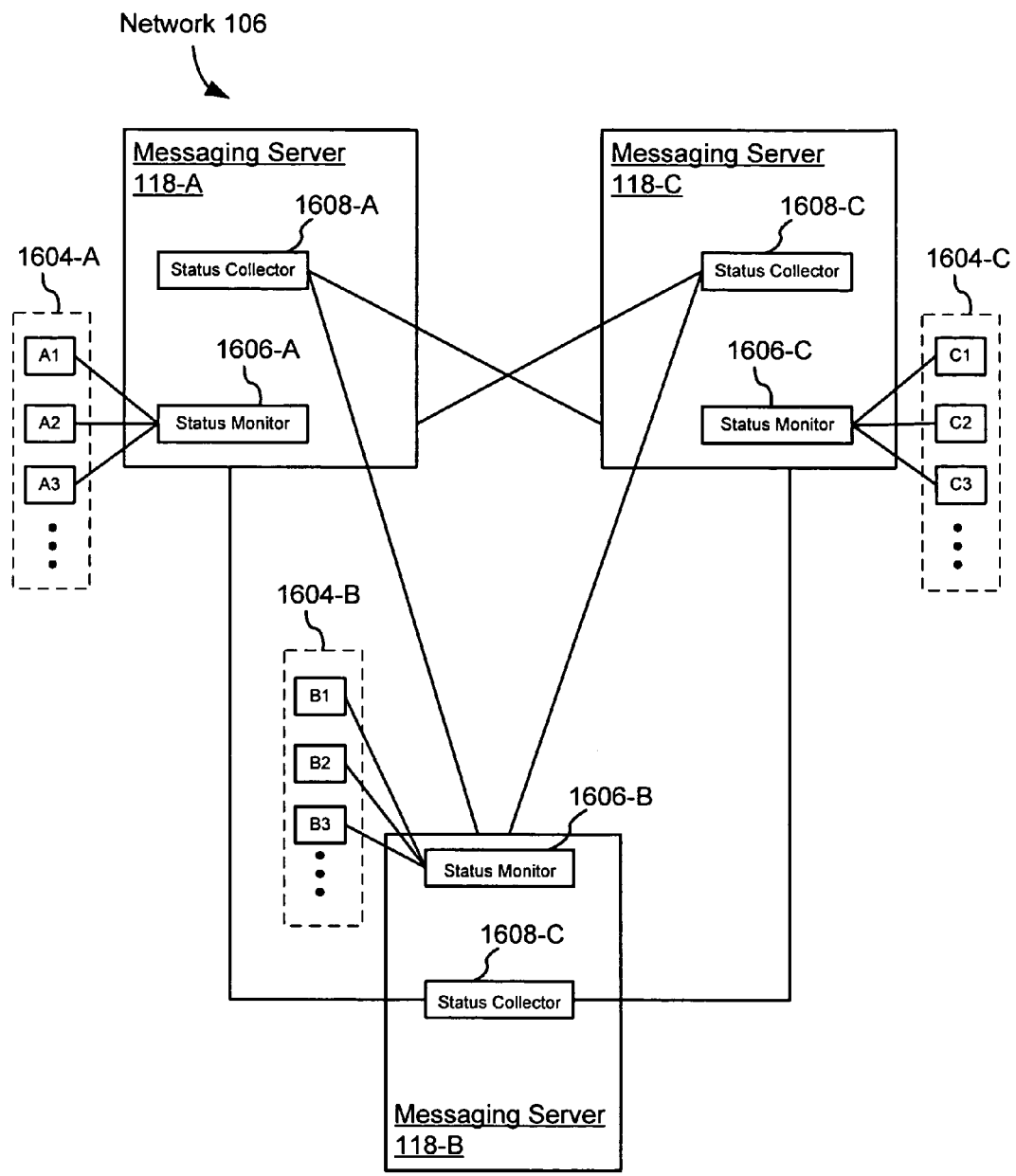
FIG. 16 is a block diagram illustrating an exemplary a network of messaging servers in accordance with embodiments of the invention.

The use of messaging servers 118 to monitor and report the status of users is now described in more detail. FIG. 16 is a block diagram illustrating an exemplary a network of messaging servers in accordance with embodiments of the invention. FIG. 16 illustrates an embodiment of a logical coupling of the messaging servers to each other and to clients for monitoring and reporting the statuses of the users on the clients. The network 106 includes messaging servers 118-A, 118-B, and 118-C. The network 106 may include more or fewer messaging servers than what is shown in FIG. 16. Each messaging server is assigned a set of one or more users. Messaging server 118-A is assigned users 1604-A. Messaging server 118-B is assigned users 1604-B. Messaging server 118-C is assigned users 1604-C. Each messaging server includes a status monitor and a status collector. Thus, messaging server 118-A includes a status monitor 1606-A and a status collector 1608-A. Messaging server 118-B includes a status monitor 1606-B and a status collector 1608-B. Messaging server 118-C includes a status monitor 1606-C and a status collector 1608-C. In some other embodiments, each of the messaging servers has one status monitor and one status collector per user that is assigned to the respective messaging server.

Whenever a user goes from offline to online (e.g., by logging in at an online communication application), the client application (e.g. text messaging module 314, audio module 316, or video module 318) sends a message to the network 106 announcing that it is online. In some embodiments, this message is routed to the messaging server assigned to the user, and the other messaging servers will not receive this message directly because it came from a user not assigned to them. The status monitor 1606 at the messaging server to which the user is assigned receives the message and changes the status of that user to "online" (or "active," "busy," or whatever status is appropriate). Furthermore, the status collector 1608 at the messaging server gathers the statuses of the contacts in that user's contact list. While some of the contacts in the user's contact list may be assigned to the same messaging server, other contacts in the user's contact list are assigned to other messaging servers. The status collector 1608 of the messaging server 118 assigned to the user gathers the statuses of the user's contacts, including those assigned to other messaging servers, and forwards at least a portion of the collected status information to the user. In some embodiments, the status collector 1608 broadcasts requests for status information of the contacts to the network and the messaging servers 118 to which the contacts are assigned respond to the requests. In some other embodiments, the status collector 1608 determines the messaging servers 118 to which the contacts are assigned and sends requests for status information to those messaging servers. In some embodiments, the contact assignments may be determined by reference to an index of all users, a copy of which may be stored in all of the messaging servers or a subset thereof, and their messaging server assignments.

For example, if a user A1 of users 1604-A, assigned to messaging server 118-A, goes from offline to online, the client application associated with the user A1 sends a message to the network 106 announcing that user A1 is online. The status monitor 1606-A at the messaging server 118-A receives the message (the other messaging servers 118-B and 118-C will not receive it) and updates the status of the user A1 to online. The status collector 1608-A at the messaging server 118-A obtains a list of the contacts in the user A1's contact list, for instance by accessing user A1's contact list. Using that list of contacts, the status collector 1608-A gathers status information from the messaging servers to which the contacts are assigned. Thus, if a contact is assigned to messaging server 118-A, then the status collector 1608-A accesses the contact's status information stored at messaging server 118-A. If the contact is assigned to messaging server 118-B, then it communicates with messaging server 118-B to get the status information. A similar procedure occurs if the contact is assigned to messaging server 118-C.

After user A1's online status changes (e.g., from online to offline, or vice versa), the messaging servers other than the one assigned to user A1 receive a status update for user A1 whenever their respective status collectors request the status of user A1. More specifically, if there are other users, assigned to other messaging servers, who subscribe to the online presence of user A1 and are currently online, then the status collectors of their assigned messaging servers will periodically request status updates for user A1.

Figure 17:
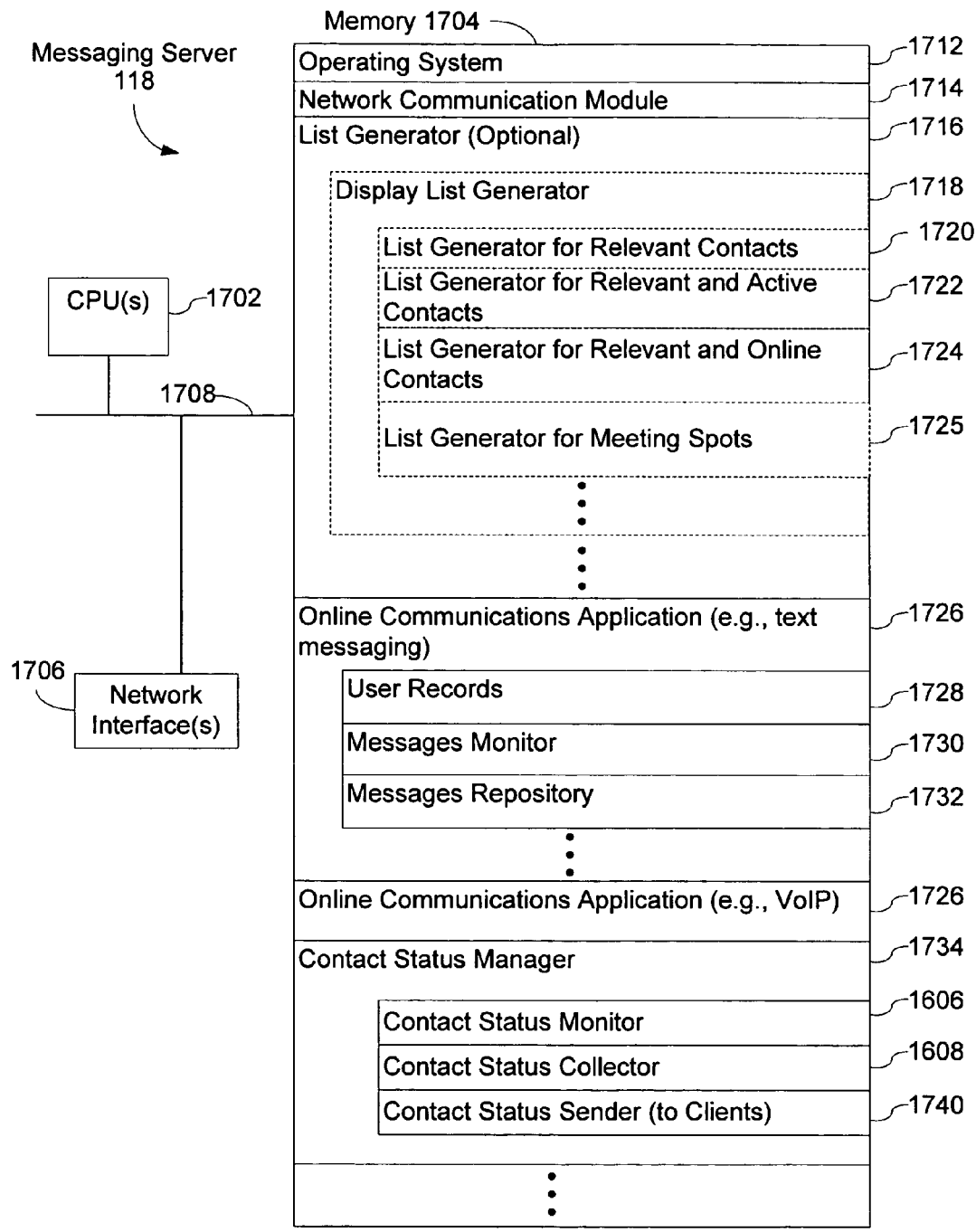
FIG. 17 is a block diagram illustrating a messaging server in accordance with embodiments of the present invention.

FIG. 17 is a block diagram illustrating a messaging server, according to some embodiments of the invention. The messaging server 118 typically includes one or more processing units (CPU's) 1702, one or more network or other communications interfaces 1706, memory 1704, and one or more communication buses 1708 for interconnecting these components. The messaging server 118 optionally may include a user interface (not shown), which may include a display device, a keyboard, and/or a mouse. Memory 1704 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1704 may optionally include one or more storage devices remotely located from the CPU(s) 1702. In some embodiments, memory 1704 stores the following programs, modules and data structures, or a subset or superset thereof:

- Operating System 1712 that includes procedures for handling various basic system services and for performing hardware dependent tasks;
- Network Communication Module (or instructions) 1714 that is used for connecting the messaging server 118 to other computers (e.g., clients 104) via the one or more communication network interfaces 1706 (wired or wireless) to one or more communication networks, such as the Internet, other wide area networks, local area networks, metropolitan area networks, and so on;
- an optional List Generator 1716 for generating lists of contacts;
- one or more online communications applications 1726, such as text messaging, audio chat, VoIP telephony, and/or video chat; and
- a Contact Status Manager 1734 for managing statuses of users.

The list generator may include a display list generator 1718, which generates lists of contacts for presentation in the display region of a client application. In some embodiments, the display list generator 1718 includes a list generator for relevant contacts 1720, a list generator for relevant and active contacts 1722, a list generator for relevant and online contacts 1724, and a list generator for meeting spots 1725. The list generator for relevant contacts 1720 generates a list of contacts that are relevant, but not necessarily active or even online at all. "Relevant," as used herein, means that the user has had interaction with the contact. Interaction may include, but is not limited to, message exchanges, scheduled meetings, transfers and/or sharing of files (such as digital images), and explicitly adding a contact to the contact list. The list of relevant contacts may be selected in accordance with a scoring function that associates a score with each contact based on the quantity, type and age of the interactions between the contact and the user. The list generator for relevant and active contacts 1722 generates a list of contacts that are relevant and "active" (or relevant and "chatty"). The list generator for relevant and online contacts 1724 generates a list of contacts that are relevant and not offline. In some embodiments, the list generator for meeting spots 1725 generates lists of other users associated with meeting spots that are also associated with a respective user for whom a list of contacts is being generated. For a given meeting spot, the list generator for meeting spots 1725 may generate a list based on predetermined criteria, such as the online status of the other users and/or matching preferences of the first user (e.g., age range, gender, sexual orientation, ethnicity, religion, languages spoken, body type, height, eye color, hair color, marital status, education level, employment situation, profession, income level, attitude towards smoking and/or drinking, recent online activity, available communication media, and/or preferred way of using communication media (e.g., "always start with a 10-minute conversation over instant messenger," or "willing to go straight to video chat")). In some embodiments, the list generator may also include list generator modules for generating lists of relevant contacts who are offline and generating lists of relevant contacts who have nonempty status messages. The lists are sent to a client device for display in the display region of the client device.

The online communication application 1726 may include user records 1728, a message monitor 1730 for monitoring message traffic to and from the messaging server 118, and a messages repository 1730 for storing messages sent and received by clients. The user records 1728 include status information and contact lists of users. In some embodiments, an online communication application may include a calendar application, and interactions between a user and other contacts may include appointments or other calendar events that reference the user's contacts.

The contact status manager 1734 includes a contact status monitor 1606, a contact status collector 1608, and a contact status sender 1740. The contact status monitor 1606 receives and processes messages announcing status changes and updates status of users. The contact status collector 1608 gathers status information for contacts in a user's contact list from other messaging servers. The contact status sender 1740 sends the status information of contacts in a user's contact list to the client associated with the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1704 may store a subset of the modules and data structures identified above. Furthermore, memory 1704 may store additional modules and data structures not described above.

Although FIG. 17 shows a "messaging server," FIG. 17 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 17 could be implemented on single servers and single items could be implemented by one or more servers. The actual number of servers used to implement a messaging server and how features are allocated among them will vary from one implementation to another, and may depend in part on the amount of data traffic that the system must handle during peak usage periods as well as during average usage periods.

Figure 18A:
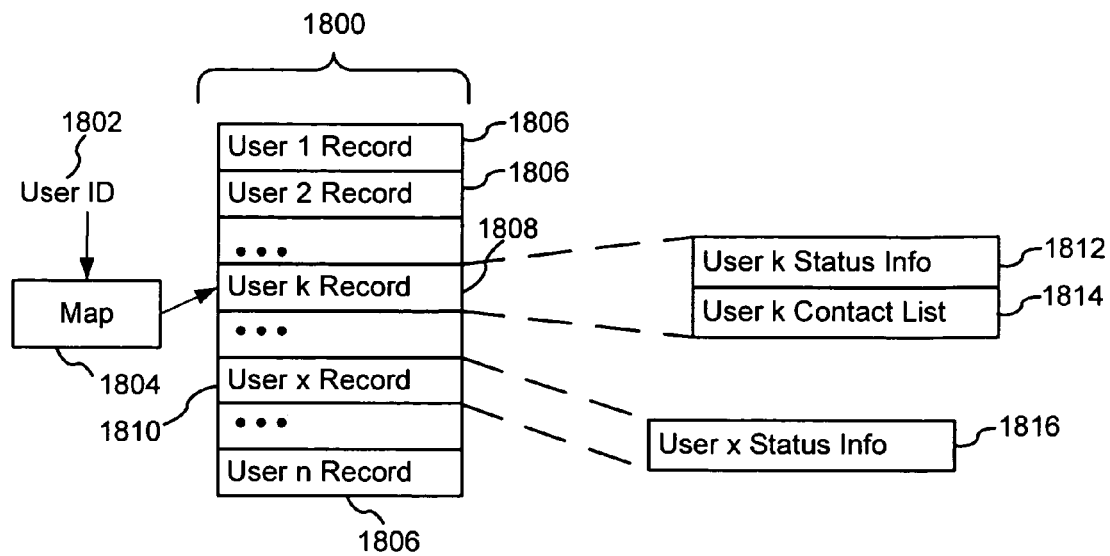
FIGS. 18A-18C are block diagrams illustrating data structures residing in a messaging server in accordance with embodiments of the invention.
Figure 18B:
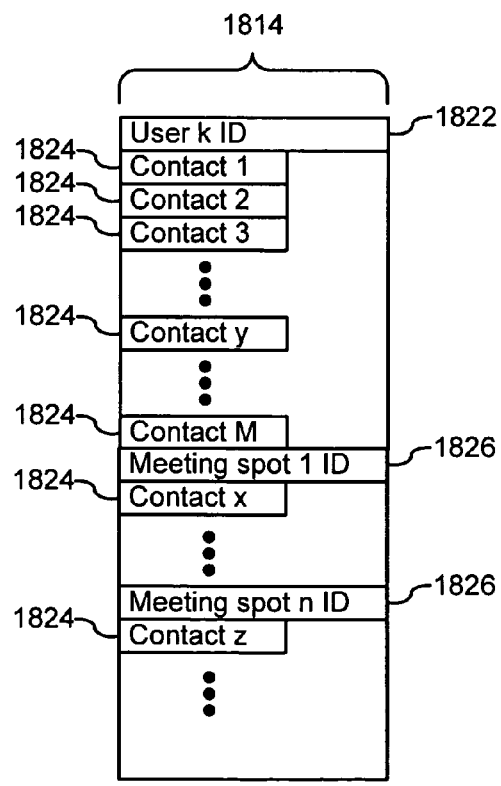
Figure 18C:
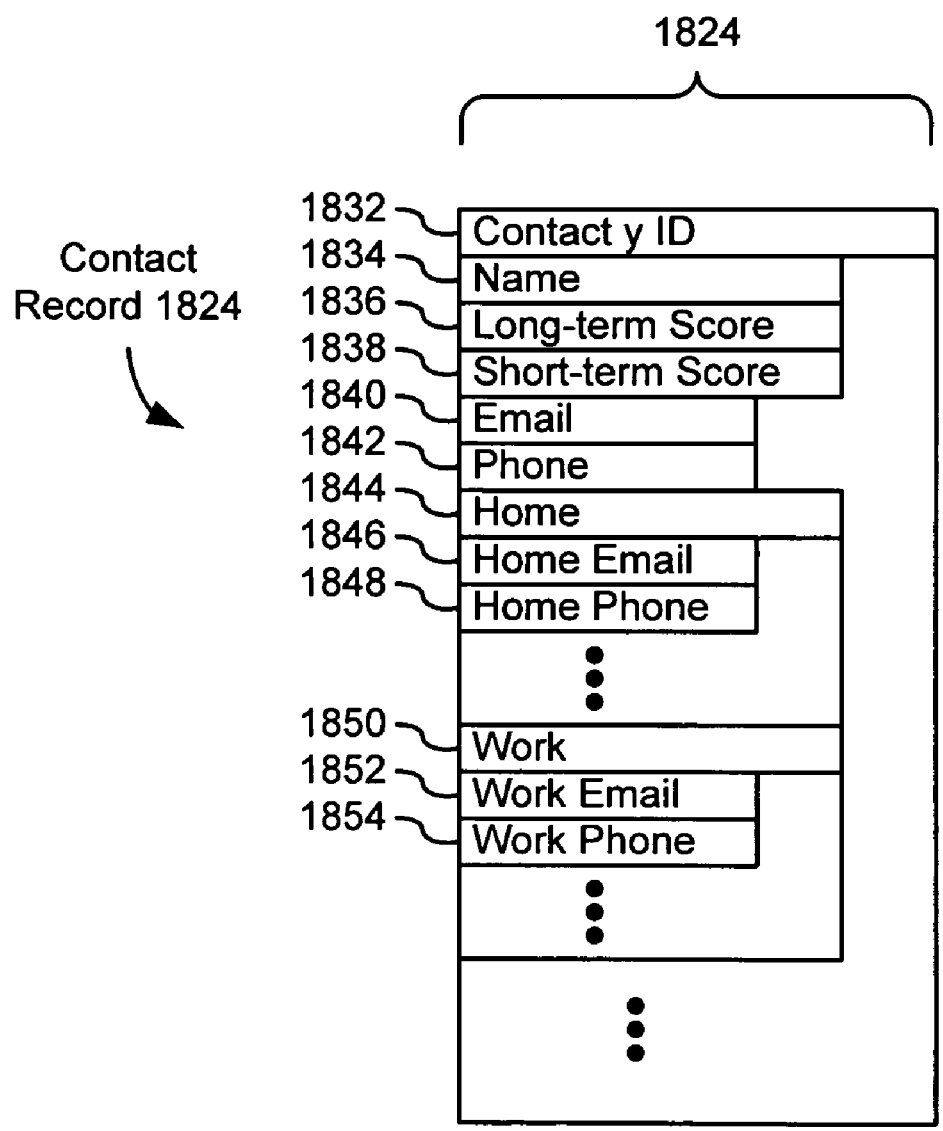

FIGS. 18A-18C are block diagrams illustrating data structures residing in a messaging server in accordance with embodiments of the invention. The messaging server stores one or more user records in a data structure 1800, as shown in FIG. 18A. Each user is associated with a unique user ID 1802. In some embodiments, the user ID is a number. In some other embodiments, the user ID is a string of characters. The string of characters may represent, for example, a username, a username and a host/domain name, or an email address.

Each user ID is associated with a user record 1806 by a map or index 1804. The messaging server includes user records for users assigned to the messaging server, such as user record 1808. The messaging server may also include user records, such as user record 1810, for users not assigned to the messaging server but which are in the contact lists of users that are assigned to the messaging server. For the user record 1808 of a user that is assigned to the messaging server, the messaging server stores that user's status information 1812 and contact list 1814. For the user record 1810 of a user who is not assigned to the messaging server, the messaging server stores that user's status information 1816. That user's contact list is stored at the messaging server to which that user is assigned.

An exemplary contact list 1814 is illustrated in FIG. 18B. It is noted that the contact list 1814 of a user record 108 in a messaging server may have a substantial amount of information that is also found in the contact list 512 of a user record 240 (FIG. 5) stored in a meeting-spot-based networking server 102. In some embodiments, the contact lists 1814 and 512 of a respective user need not be identical, while in other embodiments, the contact lists 1814 and 512 of a respective user are synchronized and therefore have the same information.

The exemplary contact list 1814, shown in FIG. 18B, includes a plurality of contact records 1824. The contact list may also include the user ID 1822 of the user, to identify the user with which the contact list is associated. The contact list may also include the meeting spot IDs 1826 of meeting spots associated with the user, to identify the meeting spots with which the contact list is associated. In some embodiments, contact information 1824 for users associated with a meeting spot in the contact list 1826 is included in the contact list 1814 (e.g., contact x for meeting spot 1 and contact z for meeting spot n in FIG. 18B). In some embodiments, meeting spot IDs 1826 serve as links to meeting spot records 228 in server 102 and the meeting spot records, in turn, include links to the contact information of users associated with the meeting spot (e.g., user IDs in field 418).

An exemplary contact record 1824 is illustrated in FIG. 18C. The contact record 1824 includes the user ID 1832 of the contact, a name of the contact 1834, an optional score 1836 sometimes called the long term score, an optional short term score 1838, an email address 1840, and a phone number 1842. The contact record may also have home contact information 1844 and work contact information 1850. The home contact information may include a home email address 1846 and a home phone number 1848. Similarly, the work contact information may include a work email address 1852 and a work phone number 1854. It should be appreciated, however, that additional or alternative information regarding the contact may be included in the contact record.

In some embodiments, the long term score 1836 is used in the generation of contact lists for presentation to a respective user. The long term score 1836 may be determined based on many factors. The factors may include, but is not limited to, an interaction history (e.g., one or more of the following: message (email and/or IM) exchanges, file transfers or sharing, calendar events) between the user and the contact. In some embodiments, the factors may further include degrees of separation between contacts and/or profile matching. The long term score measures the degree of relevance of a contact to the user over a prolonged period of time, with a higher score indicating higher relevance. In some embodiments, the long term score is decayed by a predefined percentage (e.g., 10%) at predefined intervals, such as monthly or weekly.

In some embodiments, only one contact interaction score 1836 is used for generating contact lists for presentation to the user. However, in some other embodiments, both the long term score 1836 and the short term score 1838 are used in the generation of contact lists for presentation. The short term score 1838 is a score based on short-term message activity from the user to the contact. The short term score is, in some embodiments, a running tally of messages sent by the user to the contact. Thus, a message sent by the user to the contact results in an increment of 1 of the short term score. Some special messages may result in an increment of more than 1 to the short term score. In some embodiments, the running tally counts only IM messages and special messages. The short term score measures the degree of relevance of a contact to the user over a short period of time up to the present moment. In some embodiments, the short term score is decayed by a predefined percentage (e.g., 10%) each day. In other embodiments, the short term score 1838 may be based a broader spectrum of interactions between the user and contact, including messages received and sent, and calendar events. In some embodiments, the short term score may be based on messages to the contact; or interactions between the user and contact, in a predefined time window, such as a week; or a predefined number (e.g., a number between 2 and 15) of days; or may be based on the time of the last interaction with the contact rather than an accumulated score over time.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
identifying a meeting spot associated with a first user, who is currently online and active;
identifying a plurality of other users, who are currently online and active, that have currently selected the meeting spot;
selecting a subset of the identified other users based on predefined criteria, wherein each user of the subset has currently selected two or more meeting spots that are also currently selected by the first user; and
generating for presentation in a display region a list of user contact information that corresponds to the selected subset of users.

2. A computer-implemented method, comprising: at a server computer,
associating a first user, who is currently online and active, with a meeting spot;
identifying a plurality of users other than the first user that have currently selected the meeting spot, wherein the plurality of users are currently online and active;
selecting at least some of the identified users based on predefined criteria, wherein each user of the subset has currently selected two or more meeting spots that are also currently selected by the first user; and
sending user contact information that corresponds to the selected users to a client device associated with the first user for presentation.

3. The method of claim 2, including sending the user contact information for display in a contact list of the first user.

4. A computer-implemented method, comprising:
at a client device associated with a first user who is currently online and active,
receiving from a server computer contact information for a plurality of users, who are currently online and active, that have currently selected a meeting spot; and
displaying, in a contact list of the first user, an identifier for the meeting spot and at least some of the contact information for the plurality of users that have currently selected the meeting spot, wherein each user in the plurality of users has currently selected two or more meeting spots that are also currently selected by the first user.

5. The method of claim 4, wherein the first user is associated with the meeting spot.

6. A computer-implemented method, comprising:
generating a contact list for a first user, who is currently online and active, wherein the contact list includes an identifier for a meeting spot and an adjacent list of contact information for other users, who are currently online and active, that have currently selected the meeting spot, wherein each of the other users has currently selected two or more meeting spots that are also currently selected by the first user.

7. The method of claim 6, wherein the first user is associated with the meeting spot.

8. The method of claim 6, wherein the method is performed by a client device associated with the first user.

9. The method of claim 6, wherein the method is performed by a server computer remote from a client device associated with the first user.

10. A graphical user interface on a client device, comprising:
a contact list for a first user, who is currently online and active;
in the contact list, an identifier for a meeting spot; and
a list of contact information for a plurality of users, who are currently online and active, that have currently selected the meeting spot, wherein each user in the plurality of users has currently selected two or more meeting spots that are also currently selected by the first user.

11. The graphical user interface of claim 10, wherein the identifier is a name or logo for the meeting spot.

12. The graphical user interface of claim 10, wherein the contact list is divided into sections and the list of contact information is included in a section having a section heading comprising the identifier for the meeting spot.

13. The graphical user interface of claim 10, wherein the list of contact information is adjacent to the identifier for the meeting spot.

14. The graphical user interface of claim 10, wherein the list of contact information includes links for the plurality of users.

15. The graphical user interface of claim 14, wherein activation of a link for a particular user initiates online communications with the particular user.

16. The graphical user interface of claim 10, wherein the meeting spot is associated with the first user.

17. The graphical user interface of claim 16, wherein the meeting spot is associated with the first user by a reference to the meeting spot in a record for the first user.

18. The graphical user interface of claim 17, wherein the reference to the meeting spot is added to the record for the first user when the first user activates an icon corresponding to the meeting spot.

19. The graphical user interface of claim 11, wherein the icon corresponding to the meeting spot is displayed on a digital geographic map.

20. The graphical user interface of claim 10, wherein the meeting spot is associated with the plurality of users by respective identifiers for the meeting spot in respective records for the plurality of users.

21. A server, comprising:
one or more processors;
memory; and
a program, wherein the program is stored in the memory and configured to be executed by the one or more processors, the program including:
instructions for associating a first user, who is currently online and active, with a meeting spot;
instructions for identifying a plurality of users other than the first user that have currently selected the meeting spot, wherein the plurality of users are currently online and active;
instructions for selecting at least some of the identified users based on predefined criteria, wherein each user of the subset has currently selected two or more meeting spots that are also currently selected by the first user; and instructions for sending user contact information that corresponds to the selected users to a client device associated with the first user for presentation.

22. A client device, comprising:

one or more processors;

memory; and a program, wherein the program is stored in the memory and executed by the one or more processors, the program including:

instructions for receiving from a server computer contact information for a plurality of users, who are currently online and active, that have currently selected a meeting spot; and instructions for displaying, in a contact list of a first user who is currently online and active, an identifier for the meeting spot and at least some of the contact information for the plurality of users associated with the meeting spot, wherein each user in the plurality of users has currently selected two or more meeting spots that are also currently selected by the first user.

* * * * *